US012759370B2

(12) United States Patent
Kennedy et al.

(10) Patent No.: US 12,759,370 B2

(45) Date of Patent: Oct. 13, 2026

(54) HEAT PUMP SYSTEMS HAVING DEICING FEATURES

(71) Applicant: Deere & Company, Moline, IL (US)

(72) Inventors: Thomas L. Kennedy, Moline, IL (US); Aaron J. Whalen, Moline, IL (US); Kyle A. Holl, Moline, IL (US)

(73) Assignee: Deere & Company, Moline, IL (US)

( * ) Notice: Subject to any disclaimer, the term of this patent is extended or adjusted under 35 U.S.C. 154(b) by 187 days.

(21) Appl. No.: 18/899,159

(22) Filed: Sep. 27, 2024

(65) Prior Publication Data

US 2025/0289282 A1 Sep. 18, 2025

Related U.S. Application Data

(63) Continuation-in-part of application No. 18/606,519, filed on Mar. 15, 2024.

(51) Int. Cl.
*B60H 1/00* (2006.01)

(52) U.S. Cl.
CPC ..... *B60H 1/00392* (2013.01); *B60H 1/00278* (2013.01)

(58) Field of Classification Search
CPC ............ B60H 1/00278; B60H 1/00392; B60H 1/32284
See application file for complete search history.

(56) References Cited

U.S. PATENT DOCUMENTS 7,828,099 B2 11/2010 Heckeroth
9,016,080 B2 * 4/2015 Brodie .................. F28D 20/028 62/239

(Continued)

FOREIGN PATENT DOCUMENTS

CN 211575591 U 9/2020
DE 102015205136 A1 9/2016

(Continued)

OTHER PUBLICATIONS

German Search Report issued in application No. 102025105078.3 dated Nov. 6, 2025, 16 pages.

(Continued)

*Primary Examiner* — Lionel Nouketcha
(74) *Attorney, Agent, or Firm* — Taft Stettinius & Hollister LLP; Stephen F. Rost

(57) ABSTRACT

A thermal management system configured to selectively control a flow direction of ambient air across a stack of air-side heat exchangers. During a first mode of operation, an impeller can facilitate ambient air flowing over a second air-side heat exchanger, through which a refrigerant may flow, before the ambient air flows over a first air-side heat exchanger, thereby exposing the second air-side heat exchanger, which can be operating as a condenser, to potentially colder ambient air. In a second mode of operation, the impeller can facilitate an airflow over the first-air side heat exchanger before flowing over the second air-side heat exchanger. As the second air-side heat exchanger can operate as an evaporator during the second mode, the second air-side heat exchanger can recapture from the ambient air at least a portion of heat transferred from the first air-side heat exchanger, and transfer the recaptured heat to the refrigerant.

20 Claims, 8 Drawing Sheets

(56) References Cited

U.S. PATENT DOCUMENTS

| | | | | |
|---|---|---|---|---|
| 9,789,744 | B2 | 10/2017 | Steele et al. | |
| 10,967,702 | B2 * | 4/2021 | Mancini | B60H 1/00564 |
| 11,181,034 | B2 | 11/2021 | Shidara et al. | |
| 11,597,294 | B2 | 3/2023 | Hickey | |
| 11,807,067 | B2 | 11/2023 | Mancini et al. | |
| 11,932,078 | B2 | 3/2024 | Pinto et al. | |
| 12,365,215 | B2 | 7/2025 | Pinto et al. | |
| 2010/0051711 | A1 | 3/2010 | Cavanaugh | |
| 2012/0125029 | A1 | 5/2012 | Moreau | |
| 2014/0327405 | A1 | 11/2014 | Carkner | |
| 2019/0063328 | A1 | 2/2019 | Keeney | |
| 2020/0164720 | A1 * | 5/2020 | Hötzel | B60H 1/039 |
| 2020/0247212 | A1 * | 8/2020 | Bara | B60H 1/10 |
| 2020/0254848 | A1 * | 8/2020 | Semel | F25D 21/006 |
| 2021/0291622 | A1 * | 9/2021 | Durrani | B60H 1/32281 |
| 2022/0052390 | A1 * | 2/2022 | Kim | B60H 1/00278 |
| 2022/0266656 | A1 * | 8/2022 | Mitsuhashi | F25B 1/00 |
| 2022/0371463 | A1 | 11/2022 | Stubbs et al. | |
| 2023/0356559 | A1 * | 11/2023 | Xie | B60H 1/00735 |
| 2023/0391223 | A1 | 12/2023 | Bucher et al. | |

FOREIGN PATENT DOCUMENTS

| | | | |
|---|---|---|---|
| DE | 102020109385 | A1 | 12/2020 |
| DE | 102020130958 | A1 | 5/2021 |
| DE | 102020129328 | A1 | 5/2022 |
| EP | 3606776 | B1 | 2/2022 |
| FR | 3079022 | A1 | 9/2019 |
| FR | 3129197 | A1 | 5/2023 |
| WO | 2019135334 | A1 | 7/2019 |
| WO | WO 2021228494 | A1 | 11/2021 |

OTHER PUBLICATIONS

Alex Wray and Kambiz Ebrahimi, Octovalve Thermal Management Control for Electric Vehicle, Energies, https://doi.org/10.3390/en15176118, published Aug. 23, 2022, 24 pages.

Extended European Search Report and Written Opinion issued in European Patent Application No. 25160970.7 dated Jul. 30, 2025, in 09 pages.

* cited by examiner

HEAT PUMP SYSTEMS HAVING DEICING FEATURES

FIELD OF THE DISCLOSURE

The present disclosure generally relates to heat pump systems, and, more specifically, to heat pump systems having deicing features.

BACKGROUND

Heat pumps, including heat pumps utilized with agricultural and construction vehicles, can include an external heat exchanger that attempts to draw heat from ambient air. In drawing heat from the ambient air, the external heat exchanger is colder than the ambient air. Consequently, in ambient conditions below the freezing temperature of water, and when the heat exchanger is below the dew point of ambient air, heat pump systems can encounter evaporator icing, wherein frost can accumulate on the surface of an evaporator. More specifically, in such situations, moisture in the air can condense, and subsequently freeze, on the heat exchanger. Yet an accumulation of frost on the evaporator can lead to less effective heat transfer, as well as reduce airflow through the heat exchanger.

With respect to electric vehicles that are powered by batteries rather than internal combustion engines, in such cold ambient temperatures, the battery(ies) used to provide electrical power for at least the propulsion of the vehicle can be heated, such as by an electric heater, to a threshold temperature(s). Such threshold temperatures are typically temperatures that allow the battery to operate in a manner that can accommodate the battery reaching battery performance targets. Yet, such electric heating typically consumes electrical power drawn from the battery. Further, unlike internal combustion engines, battery powered motors or engines generally do not generate sufficient waste heat for use by other portions of the associated electric vehicle. For example, such heating and/or operation of the battery typically does not generate sufficient waste heat to be transferred for heating an operator cabin of the vehicle. Thus, traditionally, in cold ambient conditions, electric vehicles consume electrical power from the battery to at least heat both the battery to the threshold temperature(s) and to heat the cabin of the vehicle.

SUMMARY

The present disclosure may comprise one or more of the following features and combinations thereof.

In one embodiment of the present disclosure, a method is provided that can include identifying, as an airflow is in a forward direction across an air-side heat exchanger, a formation of ice on the air-side heat exchanger, and select, from a plurality of heat sources, a first heat source to supply heat to elevate a temperature of a first thermal fluid to supply a heated first thermal fluid to the air-side heat exchanger. Additionally, using the heated first thermal fluid, the air-side heat exchanger can be operated as a heat rejecting heat exchanger to deice the air-side heat exchanger. Further, by operation of a reversible impeller, the airflow can be directed in a reverse direction as the air-side heat exchanger is operated as the heat rejecting heat exchanger, the reverse direction being opposite of the forward direction. The method can also include operating, as the air-side heat exchanger is operated as the heat rejecting heat exchanger, another air-side heat exchanger as a heat absorbing heat exchanger to recover at least a portion of a heat rejected by the operation of the air-side heat exchanger as the heat rejecting heat exchanger. Further, the other air-side heat exchanger is, relative to a direction of the airflow, upstream of the air-side heat exchanger when the airflow is in the forward direction, and downstream of the air-side heat exchanger when the airflow is in the reverse direction.

According to another embodiment of the present disclosure, a thermal management system is provided for at least heating, via use of an HVAC system, a cabin of a vehicle that utilizes a battery to provide electrical power for the vehicle. The thermal management system can include at least two air-side heat exchangers and a reversible impeller that is configured to adjust an airflow about the at least two air-side heat exchangers between a forward direction and a reverse direction. A first heat exchanger of the at least two air-side heat exchangers can be, relative to a direction of the airflow, downstream of a second heat exchanger of the at least two air-side heat exchangers when the airflow is in the forward direction, and upstream of the second heat exchanger when the airflow is in the reverse direction. The thermal management system can also include a memory device that can be coupled to at least one processor. The memory device can include instructions that when executed by the at least one processor can cause the at least one processor to identify, as the airflow is in the forward direction across the first heat exchanger, a formation of ice on the first heat exchanger, and select, from a plurality of heat sources, a first heat source to supply heat to elevate a temperature of a first thermal fluid to supply a heated first thermal fluid to the first heat exchanger. Additionally, the memory device can include instructions that when executed by the at least one processor can cause the at least one processor to generate one or more signals to operate, using the heated first thermal fluid, the first exchanger as a heat rejecting heat exchanger to deice the first heat exchanger, and generate one or more signals to facilitate the reversible impeller being operated to direct the airflow in the reverse direction as the first heat exchanger is operated as the heat rejecting heat exchanger. Further, the memory device can include instructions that when executed by the at least one processor can cause the at least one processor to generate one or more signals to operate, as the first heat exchanger is operated as the heat rejecting heat exchanger, the second heat exchanger as a heat absorbing heat exchanger to recover at least a portion of a heat rejected by the operation of the first heat exchanger as the heat rejecting heat exchanger.

According to another embodiment of the present disclosure, a thermal management system is provided for an electric vehicle, the thermal management system having a first fluid loop that can be fluidly coupled to a first heat load and a first air-side heat exchanger, the first fluid loop configured for a circulation of a first thermal fluid about the first fluid loop. The thermal management system can further include a second fluid loop that can be fluidly coupled to a first internal heat exchanger and a second air-side heat exchanger, the second fluid loop configured for a circulation of a second thermal fluid about the second fluid loop. A third fluid loop can be fluidly coupled to the first internal heat exchanger and a second heat load, the third fluid loop configured for a circulation of a third thermal fluid about the third fluid loop. Additionally, the thermal management system configured to selectively operate in a first mode and a second mode. In the first mode, an impeller can facilitate a flow of an ambient air in a first direction wherein the ambient air flows over the second air-side heat exchanger before the ambient air flows over the first air-side heat exchanger. Further, in the first mode, the first air-side heat exchanger can transfer a first heat generated by an operation of the first heat load from the first thermal fluid to the ambient air, and the first internal heat exchanger can transfer a second heat generated by an operation of the second heat load from the third thermal fluid to the second thermal fluid. Additionally, in the first mode, the second air-side heat exchanger can transfer the second heat from the second thermal fluid to the ambient air. In the second mode, the impeller can facilitate the flow of the ambient air in a second direction wherein the ambient air flows over the first air-side heat exchanger before the ambient air flows over the second air-side heat exchanger. Additionally, in the second mode, the first air-side heat exchanger can transfer the first heat from the first thermal fluid to the ambient air, and the second air-side heat exchanger can capture a recaptured heat comprising a portion of the first heat transferred to the ambient air and transfer the recaptured heat to the second thermal fluid to increase a temperature of the second thermal fluid, Further, in the second mode, the first internal heat exchanger can transfer at least a portion of the recaptured heat from the second thermal fluid to the third thermal fluid to elevate a temperature of the second heat load.

Additionally, according to another embodiment of the present disclosure, a thermal management system is provided for an electric vehicle, the thermal management system having a first fluid loop that can be configured to transfer, to an ambient air and when the thermal management system is operated in either a first mode or a second mode, a first heat from a first thermal fluid at a first air-side heat exchanger, the first heat generated by a first heat load. The thermal management system can also include a second fluid loop that can be configured to transfer, when the thermal management system is operated in the first mode, a second heat from a second thermal fluid at a second air-side heat exchanger to the ambient air. The second air-side heat exchanger can be further configured to, when the thermal management system is operated in the second mode, capture a portion of the first heat transferred to the ambient air and transfer the portion of the first heat to the second thermal fluid. The thermal management system can also include a third fluid loop that can be configured to, when the thermal management system is operated in the first mode, transfer, at a first internal heat exchanger, the second heat from a third thermal fluid to the second thermal fluid, the second heat being generated by an operation of a second heat load. Additionally, the second fluid loop can be further configured to, when the thermal management system is operated in the second mode, transfer at the first internal heat exchanger, at least some of the portion of the first heat from the second thermal fluid to the third thermal fluid to elevate a temperature of the second heat load. The thermal management system can also include an impeller that can be configured to direct a flow of the ambient air in a first direction when the thermal management system is operated in the first mode, and direct the flow of ambient air in a second direction when the thermal management system is operated in the second mode. The first direction can facilitate the flow of the ambient air over the second air-side heat exchanger before the ambient air flows over the first air-side heat exchanger, and the second direction can facilitate the flow of the ambient air over the first air-side heat exchanger before the ambient air flows over the second air-side heat exchanger.

According to another embodiment of the present disclosure, a method is provided for operating a thermal management system that can include directing, when the thermal management system is operating in a first mode, and by an operation of an impeller, a flow of an ambient air in a first direction at which the ambient air flows over a second air-side heat exchanger before the ambient air flows over a first air-side heat exchanger. Further, a first heat from a first thermal fluid can be transferred at the first air-side heat exchanger to the ambient air, the first heat being generated by an operation of a first heat load. The method can also include transferring, when the thermal management system is operating in the first mode, a second heat from a third thermal fluid to a second thermal fluid at a first internal heat exchanger, the second heat being generated by a second heat load. Further, when the thermal management system is operating in the first mode, the second heat can be transferred at the second air-side heat exchanger from the second thermal fluid to the ambient air. Additionally, the method can include directing, when the thermal management system is operating in a second mode, and by the operation of the impeller, the flow of the ambient air in a second direction at which the ambient air flows over the first air-side heat exchanger before the ambient air flows over the second air-side heat exchanger. Further, the second air-side heat exchanger can, when the thermal management system is operating in the second mode, recapture a portion of the first heat from the ambient air and transfer, at the second air-side heat exchanger, the portion of the first heat to the second thermal fluid. The method can further include transferring, at the first internal heat exchanger when the thermal management system is operating in the second mode, at least some of the portion of the first heat from the second thermal fluid to the third thermal fluid.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
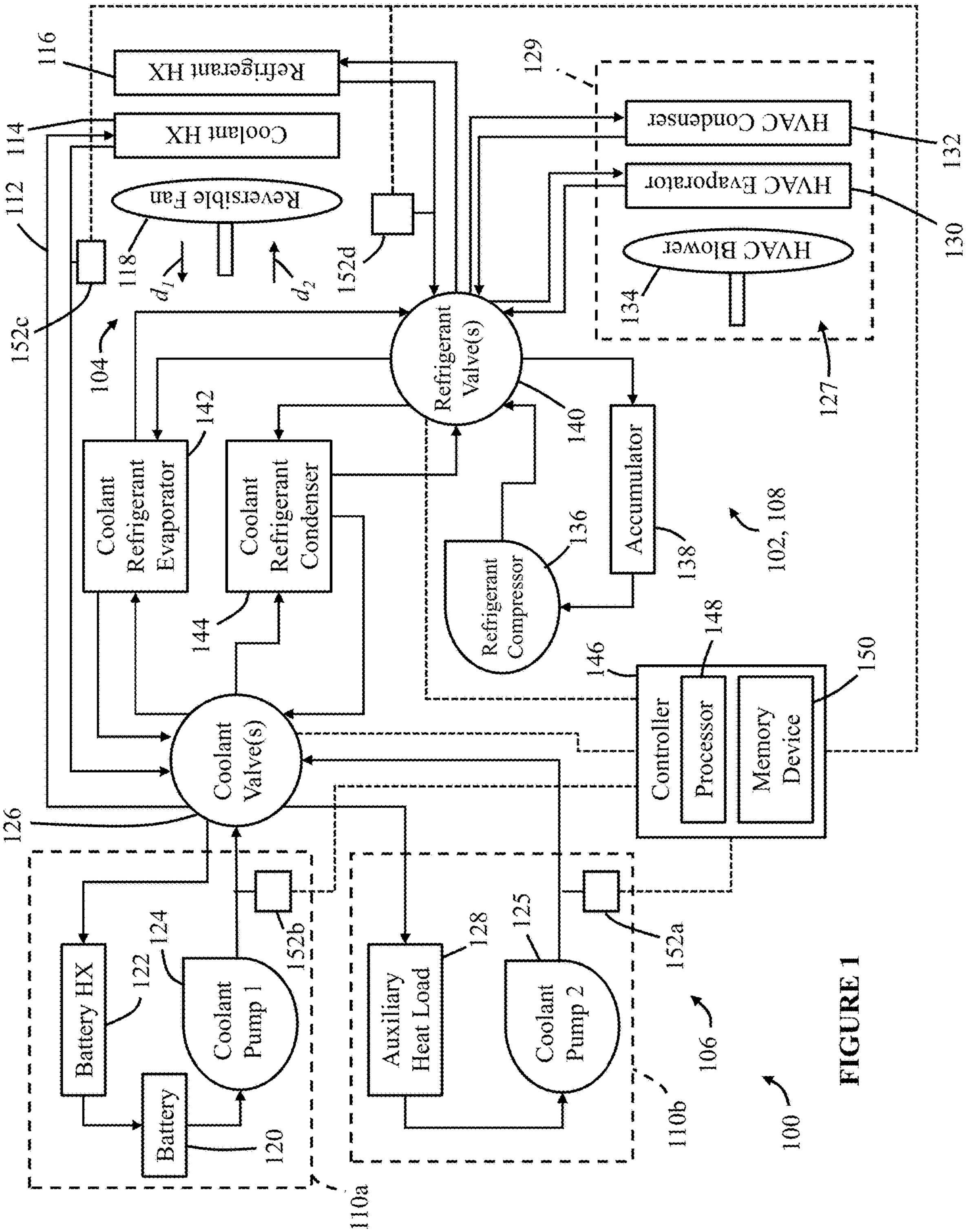
FIG. 1 illustrates a simplified representation of an exemplary thermal management system configured for the flow of first and second thermal fluids, and which includes a heat pump system and a second thermal fluid-based heating, ventilation, and cooling (HVAC) system for a cabin of a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Embodiments of the subject application relate to heat pump systems for vehicles, particularly electrical vehicles, in which at least one or more pairs of air-side heat exchangers are selectively operated as either a heat absorbing heat exchanger or a heat rejecting heat exchanger. For example, according to certain embodiments, one or more first air-side heat exchangers can, if active, selectively be operated as a heat rejecting heat exchanger or a heat absorbing, while one or more second air-side heat exchangers can, if active, be selectively operated as the other of a heat rejecting heat exchanger and a heat absorbing heat exchanger. Thus, in certain instances, the one or more first air-side heat exchangers are operated as a heat rejecting heat exchanger(s) while the one or more second air-side heat exchangers are operated as a heat absorbing heat exchanger(s), while in other instances the one or more first air-side heat exchangers are operated as a heat absorbing heat exchanger(s) while the one or more second air-side heat exchangers are operated as a heat rejecting heat exchanger(s). Further, when operating as a heat rejecting heat exchanger, heat can be provided from a selectable heat source to deice, including prevent the formation of ice on, the heat rejecting air-side heat exchanger(s). The heat pump system is also configured to selectively reverse a direction of an airflow across the air-side heat exchangers via a reversible impeller, such as, for example, a reversible fan. Controlling the direction of airflow across the air-side heat exchangers can assist the air-side heat exchanger(s) that is/are operating as a heat absorbing heat exchanger in recovering at least a portion of heat being rejected by the air-side heat exchanger(s) that is/are being operated as a heat rejecting heat exchanger, and, moreover, from the air-side heat exchanger(s) that is/are being deiced using heat from the selected heat source.

FIG. 1 illustrates a simplified thermal management system 100 having a fluid circuit 102 that includes a heat pump system 104. For at least purposes of discussion, the fluid circuit 102 is shown in FIG. 1 as having a first thermal fluid portion 106 and a second thermal fluid portion 108. The first thermal fluid portion 106 can, in this example, be configured for the flow of a first thermal fluid, such as, for example, a liquid coolant, through one or more thermal subsystems 110*a*, 110*b* that are fluidly coupled to the fluid circuit 102. For at least purposes of illustration, the exemplary first thermal fluid portion 106 of the fluid circuit 102 shown in FIG. 1 is illustrated as configured to utilize a single type of first thermal fluid, such as, for example, one of a dielectric coolant or a glycol, or water, based coolant. However, according to other embodiments, the first thermal fluid portion 106 of the fluid circuit 102 can be configured to utilize different types of thermal fluids. According to such embodiments, the fluid circuit 102 can further include one or more heat exchangers that can transfer heat from, or between, different types of coolants within the first thermal fluid portion 106 without intermixing the coolants. The second thermal fluid portion 108 in the illustrated example is configured to transport a second thermal fluid that is a different type of thermal fluid than the first thermal fluid, such as, for example, a refrigerant, including, for example, R134a, among other types of refrigerants.

For purposes of discussion, FIG. 1, as well as the other fluid circuits shown in the accompanying figures, omits certain features that may be found in such a fluid circuit 102. For example, in addition to other heat exchangers, the fluid circuit 102 can also include expansion valves, release valves, and filters, among other components. Further, the fluid circuit 102 is generally shown as having conduits 112 through which the thermal fluid(s) can flow. Such conduits 112 can comprise tubes, pipes, and/or hoses, as well as combinations thereof, and the associated fittings and couplings, among other components.

As shown in FIG. 1, the fluid circuit 102 can include a plurality of air-side heat exchangers 114, 116, including, for example, a pair of air-side heat exchangers comprising a first air-side heat exchanger 114 and a second air-side heat exchanger 116. As discussed herein, each of the first and second air-side heat exchangers 114, 116 can be selectively and separately operated as either a heat absorbing heat exchanger or a heat rejecting heat exchanger, as well as be in an inactive mode, as discussed below in more detail. For at least purposes of illustration, the first and second air-side heat exchangers 114, 116 are identified in FIG. 1 as "Coolant HX" and "Refrigerant HX", respectively, which can provide an indication of whether, in the illustrated example, the corresponding heat exchanger ("HX") 114, 116 is fluidly coupled to either the first thermal fluid portion 106 or second thermal fluid portion 108 of the fluid circuit 102. According to certain embodiments, the first air-side heat exchanger 114 can, at least during normal operating conditions, operate as a radiator for at least a portion of the first thermal fluid portion 106 of the fluid circuit 102, and the second air-side heat exchanger 116 can operate as a second thermal fluid condenser and/or evaporator for the second thermal fluid portion 108 of the fluid circuit 102.

Either or both the first and second air-side heat exchangers 114, 116 can be configured for a transfer of thermal energy with air that flows around, including, optionally or alternatively, through, the heat exchanger 114, 116. Thus, for example, one or both of the first and second air-side heat exchangers 114, 116 can include one or more fins, among other structures, which can assist in the transfer or thermal energy between that heat exchanger 114, 116 and the passing air. With respect to certain embodiments, the battery powered vehicle can attain travel speeds while the vehicle is traveling in at least a generally forward direction that can facilitate a sufficient amount or rate of airflow in a first direction (as generally indicated by "$d_1$" in FIG. 1) around the first and second air-side heat exchangers 114, 116 to attain adequate or satisfactory heat transfer between the passing air and the first and second air-side heat exchangers 114, 116. However, certain types of battery powered vehicles, including, for example, agricultural and construction equipment, may be unable to, at least at certain times, attain such travel speeds. Thus, to address such an issue, the heat pump system 104 can include a reversible impeller 118 that can, when be operated, facilitate a flow of air, or airflow, generally in the first direction around the first and second air-side heat exchangers 114, 116. In this example, when airflow is in the first direction, the first air-side heat exchanger 114 is downstream of the second air-side heat exchanger 116. Additionally, as a benefit of not attaining, or not being able to attain, such relatively high travel speeds, the reversible impeller 118 can be a reversible fan in that, when operated, can selectively facilitate a flow of air in either the first direction or a second, opposite direction (as generally indicated by "$d_2$" in FIG. 1). When airflow is in the second, reverse direction, the second air-side heat exchanger 116 is, relative to the direction of airflow, downstream of the first air-side heat exchanger 114.

As discussed below, such ability to selectively reverse the direction of airflow can assist in the recovery by one of the first and second air-side heat exchangers 114, 116 of heat that is rejected by the other of the first and second air-side heat exchangers 114, 116. For example, selectively controlling the direction of airflow can control, or adjust, which heat exchanger 114, 116 is, at least in terms of airflow direction, downstream of the other heat exchanger 114, 116. Thus, when one of the first or second air-side heat exchangers 114, 116 is operating as a heat rejecting heat exchanger, and the other of the first and second air-side heat exchangers 114, 116 is operating as a heat absorbing heat exchanger, controlling the direction at which the impeller 118 is generally directing airflow that contains heat rejected by the heat rejecting heat exchanger 114, 116 can assisting the heat absorbing heat exchanger 114, 116 in capturing at least some of the rejected heat. According to certain embodiments, the reversible impeller 118 is a reversible fan that can be selectively rotatable in either a first rotational direction or a second rotational direction, the second rotational direction being opposite of the first rotational direction. However, while the impeller 118 can, according to certain embodiments, comprise a plurality of blades that are rotatable, the impeller 118 can have a variety of other configurations, and can include other structures capable of circulating or causing movement of the air, including, for example, blowers, among other air circulation devices.

The fluid circuit 102, and in particular the first thermal fluid portion 106 of the fluid circuit 102, can also include one or more, if not a plurality, of the thermal subsystems 110*a*, 110*b*. Each thermal subsystem 110*a*, 110*b* can be utilized to control a temperature of a heat load 128 that is part of, including, for example, fluidly coupled to, that particular thermal subsystem 110*a*, 110*b*. For example, each thermal subsystem 110*a*, 110*b* can be configured to utilize the first thermal fluid (e.g., coolant) that can flow through at least a portion of the fluid circuit 102 to control the temperature of one or more components, systems, or devices of the electrical vehicle that, during operation, can at least generate heat that is managed via use of at least the first thermal fluid. Such thermal subsystems 110*a*, 110*b* can further include, or utilize, heat exchangers, which may, or may not, include heat exchangers that are dedicated to a particular thermal subsystem 110*a*, 110*b* and/or heat exchangers that are shared with other thermal subsystems 110*a*, 110*b*. Additionally, during normal operating conditions, such as, for example, when ambient temperatures are above the freezing point of water, the first air-side heat exchanger 114 can operate as a radiator for one or more of the thermal subsystems 110*a*, 110*b*, and, moreover, can operate as a heat rejecting heat exchanger.

FIG. 1 illustrates an exemplary first thermal subsystem 110*a* that is configured to use first thermal fluid to manage an operating temperature of one or more batteries 120, including one or more batteries 120 that are utilized to provide electrical power for at least propulsion of the vehicle. According to certain embodiments, the first, battery thermal subsystem 110*a* can include at least one battery heat exchanger 122 that can be used in controlling a temperature of the first thermal fluid circulating through at least a portion of the thermal subsystem 110*a*. The first thermal subsystem 110*a* can also include one or more first fluid pumps 124 (referred to in FIG. 1 as "Coolant Pump 1") that can assist in circulating the first thermal fluid through at least the battery(ies) 120 and/or the first thermal subsystem 110*a*. As previously mentioned, certain other components that can be fluidly coupled to the first thermal subsystem 110*a*, including, but not limited to a reservoir, filter, electric heater, and/or release valve, among other components, are not illustrated for purposes of simplification of the figures. Additionally, at least a portion of the first thermal fluid that flows through the first thermal subsystem 110_a_ can pass through a first multi-mode valve 126, as discussed further below. According to the exemplary illustrated embodiment, the first multi-mode valve 126 is a multi-mode coolant valve.

The fluid circuit 102 can also include one or more other, or second, thermal subsystems 110_b_ that are configured to manage the temperature of one or more other heat loads 128. For example, according to certain embodiments, at least one of second thermal subsystem 110_b_, including a electrics thermal subsystem, can be utilized to control the temperature of heat loads 128 in the form of electric components of the electric vehicle, including, for example, inverters and/or converters, among other electric heat loads 128. Additionally, that same thermal subsystem 110_b_, or another thermal subsystem 110_b_, can utilize the first thermal fluid to control the temperature of one or more heat loads 128 of a transmission system of the vehicle, including, for example, heat generated by a transmission of the transmission system. Additionally, another shared or dedicated second thermal subsystem 110_b_ can utilize the first thermal fluid to control the temperature of a heat source 128 of a hydraulics system of the vehicle. As generally represented in FIG. 1, each of these other, or second thermal subsystems 110_b_ can include one or more heat loads 128 and a second fluid pump 125 (identified in FIG. 1 as "Coolant Pump 2"), among other components associated with the thermal management of the associated heat load(s) 128. Additionally, at least a portion of the first thermal fluid that flows through the thermal subsystem(s) 110_b_ can also pass through the first multi-mode valve 126, as discussed further below.

In the exemplary thermal management system 100 shown in FIG. 1, the second thermal fluid portion 108 of the fluid circuit 102 can include a second thermal fluid-based heating, ventilation, and air condition (HVAC) system 127 that is selectively operable to either heat or cool a cabin 129 of the vehicle. The cabin 129 can be configured for an operator to be seated and/or stand while the operator operates the vehicle. As seen in at least FIG. 1, the second thermal fluid-based HVAC system 127 can include an HVAC evaporator 130, HVAC condenser 132, and HVAC impeller 134, such as, for example, a blower or fan, among other air circulation devices. As seen in FIG. 1, the HVAC impeller 134 can be configured to blow air that has at least been either heated or cooled by operation of the HVAC system 127 into, and/or about, the cabin 129. The HVAC system 127 and/or second thermal fluid portion 108 of the fluid circuit 102 can further include a thermal fluid compressor 136 (referred to in FIG. 12 as a "Refrigerant Compressor") and an accumulator 138. Again, the HVAC system 127 can include a variety of other components or devices that, for purposes of illustration and discussion, are not shown in the FIG. 1. Additionally, as seen in at least FIG. 1, at least a portion of the second thermal fluid that is circulated within the HVAC system 127, as well as other portions of the second thermal fluid portion 108 of the fluid circuit 102, can pass through a second multi-mode valve 140, which, in the illustrated embodiment can be a multi-mode refrigerant valve. Moreover, as seen in FIGS. 1, the second multi-mode valve 140 can be configured to receive and/or deliver second thermal fluid to at least each of the HVAC evaporator 130 and the HVAC condenser 132, as well as receive second thermal fluid from the thermal fluid compressor 136 and deliver second thermal fluid to the accumulator 138.

The fluid circuit 102 can also include a second set, or secondary, heat exchangers 142, 144 that are configured to at least transfer heat between first thermal fluid from at least a portion of the first thermal fluid from the first thermal fluid portion 106 and second thermal fluid from at least a portion of the second thermal fluid portion 108 of the fluid circuit 102. According to certain embodiments, the secondary heat exchangers 142, 144 can include a first secondary heat exchanger 142 that is a heat absorbing heat exchanger, such as, for example, an evaporator, and a second secondary heat exchanger 144 that is a heat rejecting heat exchanger, such as, for example, a condenser. As discussed below, in the illustrated embodiment, the secondary heat exchangers 142, 144 are utilized to at least selectively transfer heat between the first thermal fluid circulated from, or to, one or more of the first thermal subsystem 110_a_, second thermal subsystem (s) 100_b_, and/or first air-side heat exchanger 114 and second thermal fluid circulated to, or from, the HVAC system 127, compressor 136, and/or second air-side heat exchanger 116.

As seen in FIG. 1, the first multi-mode valve 126 can be operated to control whether first thermal fluid from the first air-side heat exchanger 114, first thermal subsystem 110_a_, or a particular second thermal subsystem 110_b_ is supplied to a particular one of the secondary heat exchangers 142, 144, as well which of the first air-side heat exchanger 114, first thermal subsystem 110_a_, or a particular second thermal subsystem 110_b_ receives first thermal fluid outputted from a particular one of the secondary, heat exchangers 142, 144. Moreover, the first multi-mode valve 126 can be configured to at least reverse the flow of first thermal fluid through the first thermal fluid portion 106 of the fluid circuit 102. Similarly, the second multi-mode valve 140 is configured to control which of the second air-side heat exchanger 116, compressor 136, or HVAC system 127 supplies second thermal fluid to a particular one of the secondary heat exchangers 142, 144, as well as which of the second air-side heat exchanger 116, compressor 136, or HVAC system 127 is to receive the second thermal fluid outputted from the selected secondary, heat exchanger 142, 144. Additionally, the second multi-mode valve 140 can be configured to at least reverse the flow of second thermal fluid through the second thermal fluid portion 108 of the fluid circuit 102.

Further, according to certain embodiments, the first multi-mode valve 126 can be operated in conjunction with the second multi-mode valve 140 such that the first multi-mode valve 126 directs first thermal fluid to one of the first secondary heat exchanger 142 or the second secondary heat exchanger 144, while the second multi-mode valve 140 directs second thermal fluid to the other of the first secondary heat exchanger 142 and the second secondary heat exchanger 144.

The thermal management system 100 can also include one or more controllers 146 having at least one processor 148 and at least one memory device 150. The controller 146, processor(s) 148, and/or memory device(s) 150 may, or may not, be dedicated to the operation of the thermal management system 100, or components of the thermal management system 100. Thus, for example, according to certain embodiments, the processor 148 can comprise one or more processors, including compute circuits, that can be utilized to control operation of the thermal management system 100, and, optionally, can also be utilized in connection with controlling the operation of the heat pump system 102, among other components of an associate cooling system, engine/motor, or vehicle. Therefore, according to certain embodiments, one controller 146, including one or more processors 148 of that controller 146, can be utilized to control operation of at least the thermal management system 100, or the corresponding components of the thermal management system 100. Alternatively, a plurality of controllers 146, or combinations of processors 148, including compute circuits, can be utilized to control operation of the thermal management system 100, as well as control operations of different components of the heat pump system 102 and/or vehicle. Thus, for example, while certain embodiments herein may mention functions being performed by a controller 146, including the associated processor 148, such functions can be performed by a single controller or processor, or, alternatively, one or more functions can be performed by one or more controllers or processors, and one or more other functions can be performed by one or more other controllers or processors or combinations of controllers or processors.

The memory device 150 can have instructions stored therein that are executable by the processor 148 to cause the processor 148 to at least operate, including adjust, a position or orientation of the first multi-mode valve 126 and second multi-mode valve 140, activate and deactivate one or both of the impellers 118, 134, and/or control whether the reversible impeller 118 is being operated to direct airflow in the first direction or the second direction, among operating other components or potions of the thermal management system 100. The processor 148 can be embodied as, or otherwise include any type of processor, controller, or other compute circuit capable of performing various tasks such as compute functions and/or controlling the functions of at least the thermal management system 100 and/or associated components of the heat pump system 102. For example, the processor 148 can be embodied as a single or multi-core processor(s), a microcontroller, or other processor or processing/controlling circuit. In some embodiments, the processor 148 can be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 148 can be embodied as, or otherwise include a high-power processor, an accelerator co-processor, or a storage controller.

The memory device 150 can be embodied as any type of volatile (e.g., dynamic random-access memory (DRAM), etc.) or non-volatile memory capable of storing data therein. Volatile memory may be embodied as a storage medium that requires power to maintain the state of data stored by the medium. Non-limiting examples of volatile memory may include various types of random-access memory (RAM), such as dynamic random-access memory (DRAM) or static random-access memory (SRAM). One particular type of DRAM that may be used in a memory module is synchronous dynamic random-access memory (SDRAM).

In some embodiments, the memory device 150 can be embodied as a block addressable memory, such as those based on NAND or NOR technologies. The memory device 150 can also include future generation nonvolatile devices, such as a three-dimensional crosspoint memory device (e.g., Intel 3D XPoint™ memory), or other byte addressable write-in-place nonvolatile memory devices. In some embodiments, the memory device 150 can be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device 150 can refer to the die itself and/or to a packaged memory product. In some embodiments, 3D crosspoint memory (e.g., Intel 3D XPoint™ memory) can comprise a transistor-less stackable cross point architecture in which memory cells sit at the intersection of word lines and bit lines and are individually addressable and in which bit storage is based on a change in bulk resistance.

The thermal management system 100 can also include a plurality of sensors 152*a-d* (generally referred to herein as sensor 152) that can provide information, including measurements, among other data and information, to the controller 146 and/or the processor 148. A variety of types, and combinations, of sensors 152*a-d* can be utilized. For example, the thermal subsystems 110*a*, 110*b* can each include one or more temperature sensors 152*a*, 152*b* that can provide an indication of the temperature of the first thermal fluid flowing within the thermal subsystem 110*a*, 110*b* and/or the temperature of one or more heat sources 128, including, for example, the battery 120 of that thermal subsystem 110*a*, 110*b*.

Additionally, one or more sensors 152*c*, 152*d* can be utilized with one, or both, of the first and second air-side heat exchangers 114, 116. For example, according to certain embodiments, at least one, if not both, of the first and second air-side heat exchangers 114, 116 can include sensors 152 that can provide information indicating to, or used to determine by, the controller 146 and/or processor 148 of a change, or lack thereof, in temperature of the first and/or second thermal fluid across the associated first or second air-side heat exchanger 114, 116. More specifically, according to certain embodiments, an inlet sensor 152 can be positioned to measure a temperature of the first and/or second thermal fluid entering the associated first or second air-side heat exchanger 114, 116, and an outlet sensor 152 can be positioned to measure the temperature of the first and/or second thermal fluid that has, or is, exiting the associated first or second air-side heat exchanger 114, 116. Such a detection of the extent, if any, of the change in temperature of the first or second thermal fluid across the corresponding first or second air-side heat exchanger 114, 116 by the controller 146 and/or processor 148 can indicate if the first or second air-side heat exchanger 114, 116 is performing as anticipated. For example, a minimal, if any, change in temperature of the first and/or second thermal fluid across the corresponding first or second air-side heat exchanger 114, 116 can result in the controller 146 and/or processor 148 determining, including predict, that the associated air-side heat exchanger 114, 116 is experiencing a presence, including, for example, a formation, of ice on one or both heat exchangers 114, 116 that is adversely impacting the performance of that heat exchanger 114, 116. However, a determination or prediction of the presence of ice on one or both of the first and second air-side heat exchangers 114, 116 can be based on other measurements or information provided by sensors 152 at various locations about the fluid circuit 100 that indicates the thermal management system 100, or portions thereof, is/are not behaving as expected. For example, the temperature of the second thermal fluid at one or more locations about the second thermal fluid portion 108 of the fluid circuit 100 and/or the temperature of the first thermal fluid at one or more locations about the first thermal fluid portion 106 of the fluid circuit 100 can provide an indication to the controller 146 and/or processor 148 of a presence, including a formation, of ice on one or both of the first and second air-side heat exchangers 114, 116.

While the foregoing examples discuss the sensors 152 being temperature sensors, the thermal management system 100 can include a variety of other sensors 152 in addition to, or in lieu of, temperature sensors. Further, such other types of sensors 152 can be used with, or without, information provided by temperature sensors 152 to indicate a status of one or more portions of the thermal management system 100. For example, with respect to providing information that the controller 146 and/or processor 148 can utilize to determine, including predict, whether there is a presence, including a formation, of ice on one or more of the first and second air-side heat exchangers 114, 116, one or more of the sensors 152 can include a pressure and/or flow sensor(s). Additionally, one or more sensors 152 can be utilized to provide information regarding an external or ambient humidity and/or an ambient temperature, which can be used by the controller 146 and/or processor 148, among other information, to determine, including predict, whether ice is present, including forming, on one or both of the first and second air-side heat exchangers 114, 116. In addition to, or in lieu of, the information provided by the sensors 152, the controller 146 and/or processor 148 can be configured to determine, including predict, whether ice is present, including forming, on either or both the first and second air-side heat exchangers 114, 116 based on a duration of time during which the first or second air-side heat exchanger(s) 114, 116 have been functioning as a heat absorbing heat exchanger. For example, information regarding a duration of time, as may be indicated by use of a timer that is part of, or communicatively coupled to, the controller 146, can indicate how long the first or second air-side heat exchanger 114, 116 has been operating as an evaporator, and based on at least such time information, determine whether ice is anticipated to be present on that heat exchanger 114, 116. Such timer-based determination can also include consideration of a variety of other information, including, but not limited to, current ambient conditions, and the thermal fluid temperature(s) among various portions of the thermal management system 100, among other information.

Figure 2A:
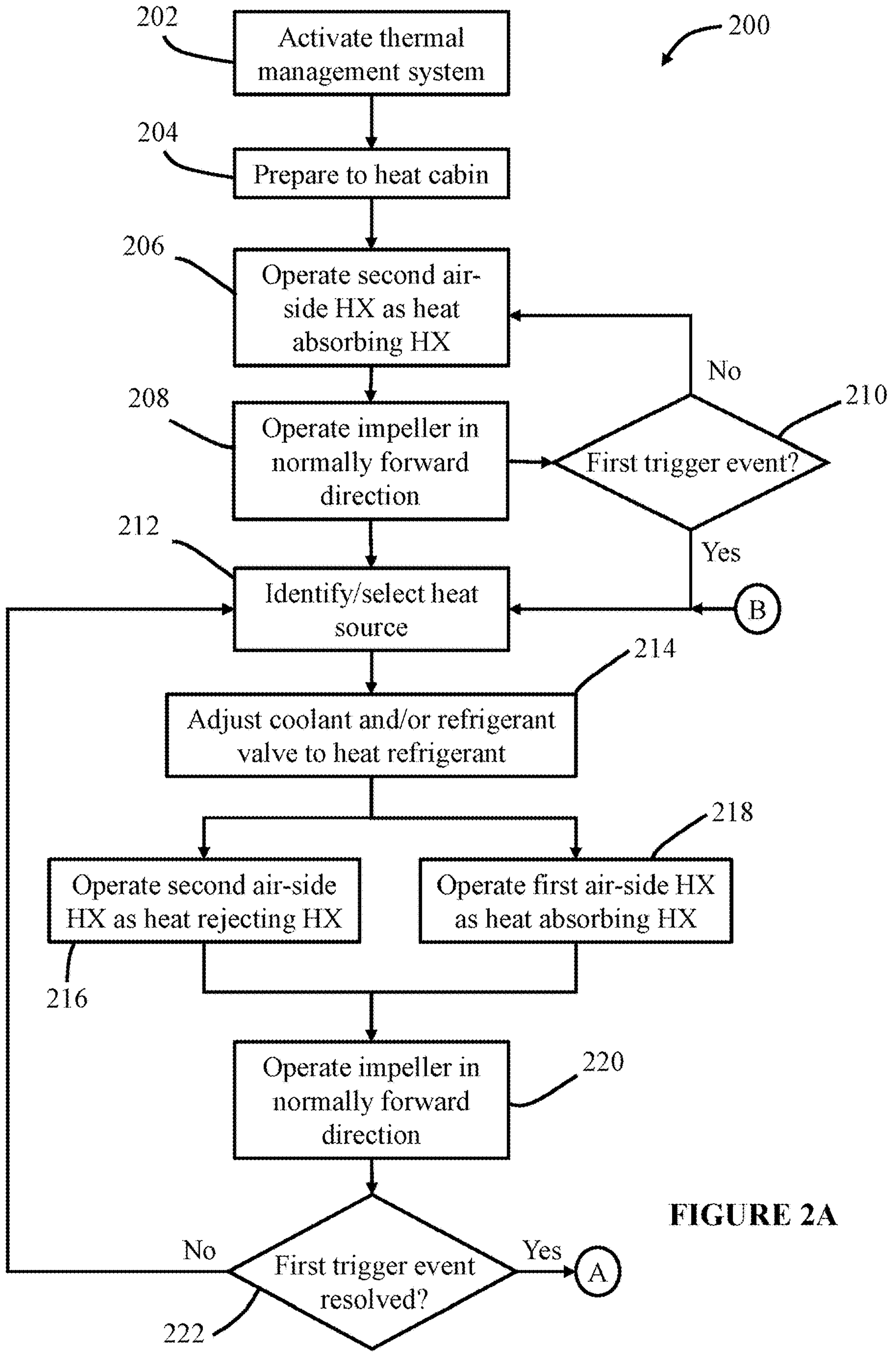
FIGS. 2A and 2B illustrate a simplified flow diagram of an exemplary method for deicing air-side heat exchangers of the heat pump system of the exemplary thermal management system shown in FIG. 1.
Figure 2B:
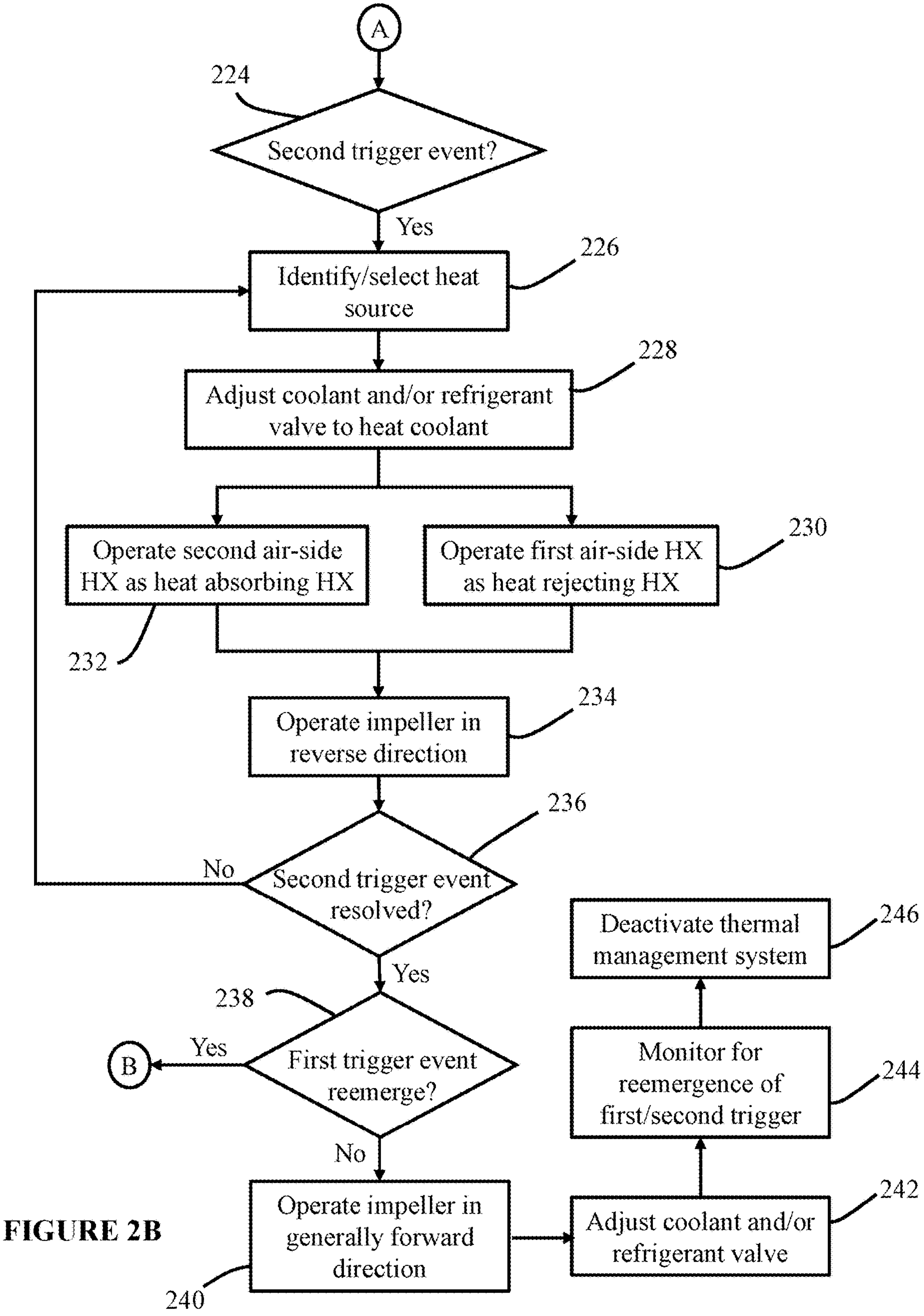

FIGS. 2A and 2B illustrate a simplified flow diagram of an exemplary method 200 for deicing air-side heat exchangers 114, 116. The method 200 is described below in the context of being carried out by the illustrated exemplary thermal management system 100 shown in FIG. 1. However, it should be appreciated that method 200 can likewise be carried out by any of the other described implementations, as well as variations thereof. Further, the method 200 corresponds to, or is otherwise associated with, performance of the blocks described below in the illustrative sequence of FIGS. 2A and 2B. It should be appreciated, however, that the method 200 can be performed in one or more sequences different from the illustrative sequence. Additionally, one or more of the blocks mentioned below may not be performed, and the method 200 can include steps or processes other than those discussed below.

At least in certain instances in which the surrounding ambient temperature is cold, at block 202, the thermal management system 100 can be activated, such as, for example, via operation of an ignition or starting system of the associated vehicle. Moreover, the thermal management system 100 can be activated by the associated vehicle being changed from an off condition to an on or start condition. At block 204, the HVAC system 127 can be activated in a manner in which the HVAC system 127 is to be utilized to heat the cabin 129 of the vehicle. Such activation of the HVAC system 127 can be automatic, such as, for example, based on a selected or preset air temperature for within the cabin 129, or manually activated by an operator of the vehicle, such as, for example, via use of one or more heating/cooling related buttons, dials, slides, switches, or related input devices, including touch screens, or among other HVAC related control settings.

In at least certain instances, in response to a determination that the HVAC system 127 is to be activated in a manner that provides heat for the air temperature of the cabin 129, the processor 148 can generate one or more signals to facilitate the positioning, orientation, or configuration (collectively referred to herein as configuration) of the second multi-mode valve 140 in a position at which second thermal fluid passes to the second air-side heat exchanger 116 in an attempt to at least heat the second thermal fluid using heat from the ambient air. Thus, in such a situation, the second air-side heat exchanger 116 can be operated as an evaporator, and, moreover, an evaporator that absorbs heat to increase a temperature of the second thermal fluid flowing through the second air-side heat exchanger 116. Additionally, in such an instance, particularly wherein the vehicle is initially being started, the first air-side heat exchanger 114 can be inactive. Further, at block 208, the processor 148 can operate the reversible impeller 118 such that air is drawn toward the second air-side heat exchanger 116. An example of such a scenario with respect to a portion of the heat pump system 104 is depicted by the first mode of operation for the heat pump system 104 depicted in FIG. 3. According to certain embodiments and situations, while the heat pump system 104 is operating in the first mode, heat being absorbed by the second air-side heat exchanger 116 can be utilized by the HVAC system 127 in connection with at least attempting to heat the air temperature within the cabin 129.

Figure 3:
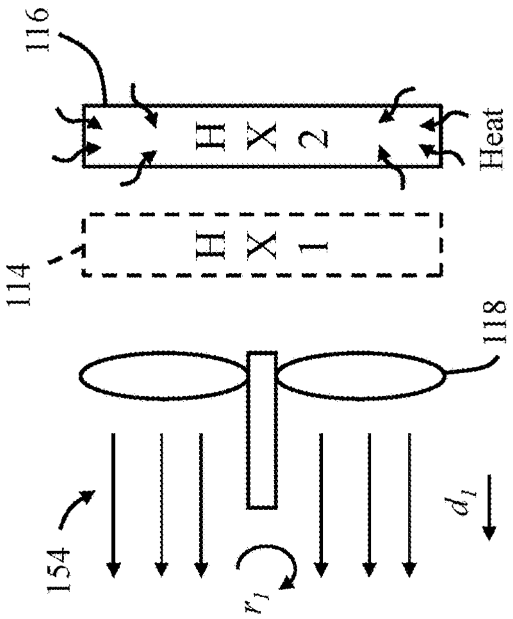
FIG. 3 illustrates a first mode of operation for a heat pump system in which a first air-side heat exchanger is inactive, a second air-side heat exchanger is operating as a heat absorbing heat exchanger, and a reversible impeller is directing airflow in a first direction.

More specifically, FIG. 3 illustrates a first mode of operation of the heat pump system 104 in which the second air-side heat exchanger 116 is operating as a heat absorbing heat exchanger, the first air-side heat exchanger 114 is inactive (as indicated by the broken line format for the first air-side heat exchanger 114), and a reversible impeller 118 is directing airflow 154 in the first direction (as also generally indicated by the direction "$d_1$" in FIG. 3). According to certain embodiments, the first direction ($d_1$) of airflow 114 can be opposite to the direction at which the vehicle moves while the vehicle travels in a forward direction. Further, as seen in FIG. 3, according to embodiments in which the reversible impeller 118 is a fan, during the first mode of operation of the heat pump system 104, the fan (impeller 118) can be rotating in a first or forward rotational direction, as generally indicated by the rotational direction "$r_1$" in FIG. 3. Further, during the first mode of operation, the reversible fan (impeller 118) can generally continuously operate in the forward rotational direction, aside from potential periodic changes in rotational direction associated with debris removal procedures. Additionally, with respect to at least the reversible impeller 118 and the second air-side heat exchanger 116, the illustrated first mode of operation of the heat pump system 104 can be the default or normal mode of operation when the vehicle is operating in generally hot ambient conditions, such as, for example, when the ambient temperature exceeds the freezing temperature for water. However, in such situations, rather than being inactive, the first air-side heat exchanger 114 may, at least at times, be utilized as a heat rejecting heat exchanger, such as, for example, a radiator, for the first thermal fluid portion 106 of the thermal management system 100.

At block 210, the processor 148 can determine, including, predict, whether the second air-side heat exchanger 116 is, or may be, experiencing a current or upcoming presence, including a formation, of ice on the second air-side heat exchanger 116. As previously discussed, such a determination can be arrived using a variety of different types of information, including, but not limited to, temperature, pressure, and/or humidity information obtained from, or provided by, by one or more sensors 152*a-d* relating to the first and/or second thermal fluids within the fluid circuit 102 and/or of the surrounding ambient environment. Additionally, as previously discussed, such a determination, including prediction, can be based on a duration of time that the second air-side heat exchanger 116 has been operating as a heat absorbing heat exchanger (e.g., an evaporator), as well as a duration of time in view of other information, including, but not limited to, temperature and humidity related information. As identified in FIG. 2A, such a determination at block 210 as to the current, or predicted, presence, including formation, of ice on the second air-side heat exchanger 116 can, for at least purposes of discussion, be referred to herein as a first trigger event. If the processor 148 determines, including predicts, the first trigger event has not happened, or is not anticipated to occur within a predetermined time frame, then at least the second air-side heat exchanger 116 and the reversible impeller 118 can continue operating in a manner associated with the above-discussed the first mode of operation of the heat pump system 104.

Figure 4:
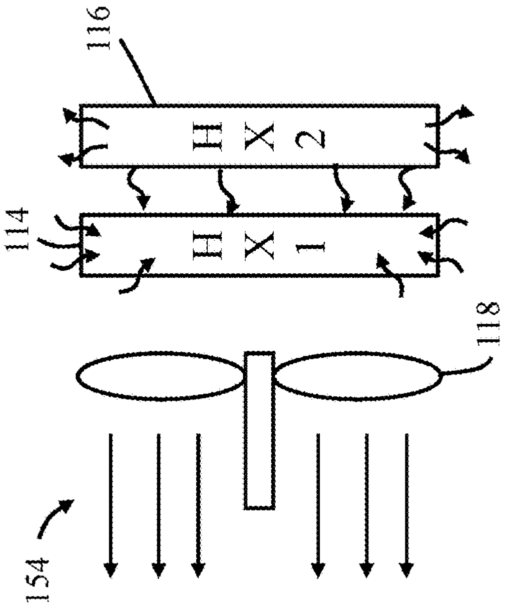
FIG. 4 illustrates a second mode of operation for the heat pump system shown in FIG. 3 in which the first air-side heat exchanger is operating as a heat absorbing heat exchanger, the second air-side heat exchanger is operating as a heat rejecting heat exchanger, and the reversible impeller is generally directing airflow in the first direction.

If the determination is made by the processor 148 at block 210 that the first trigger event has occurred, or will be occurring within a predetermined time period, then the mode of operation of the heat pump system 104 can change to a second mode of operation, which is generally by FIG. 4. In the illustrated example, in the second mode of operation of the heat pump system 104, one or more portions of the fluid circuit 100 can be identified as a heat source that can be utilized to provide heat to the second thermal fluid (e.g. refrigerant) that is supplied to the second air-side heat exchanger 116 such that the second air-side heat exchanger 116 changes from operating as a heat absorbing heat exchanger (e.g., an evaporator) to a heat rejecting heat exchanger (e.g. a condenser). Accordingly, heat being released or rejected from the second air-side heat exchanger 116 can be used to deice the second air-side heat exchanger 116. Additionally, in such a situation, the first air-side heat exchanger 114 can be operated as a heat absorbing heat exchanger (e.g., an evaporator) that at least attempts to recover at least a portion of the heat being rejected from the second air-side heat exchanger 116. Thus, in such a situation, the reversible impeller 118 can continue to be operated in a manner that directs the airflow in the first direction such that, relative to at least the direction of the airflow, the first air-side heat exchanger 114 is downstream of the second air-side heat exchanger 116. Such downstream positioning of the first air-side heat exchanger 114 can aid the first air-side heat exchanger 114 in recapturing at least some of the heat that has been rejected by the second air-side heat exchanger 116. The heat recaptured by the first air-side heat exchanger 114 can then be utilized by the thermal management system 100 in at least assisting in heating at least a portion of the first thermal fluid. Moreover, such recovered heat can assist in heating at least a portion of the first thermal fluid portion 106 of the fluid circuit 102, including, but not limited to, the battery 120, among other components of one or more thermal subsystems 110*a*, 110*b*.

In view of the foregoing, in response to the determination, including prediction, made by the processor block 210 regarding the first trigger event having occurred, or will be occurring, the processor 148 can, according to certain embodiments, identify one or more heat source0, including one or more heat loads 128, at block 212 that can provide heat that can be directly or indirectly transferred from the associated first thermal fluid to the second thermal fluid such that heated second thermal fluid can be supplied to the second air-side heat exchanger 116 in connection with the second air-side heat exchanger 116 operating as a heat rejecting heat exchanger.

A variety of criteria can be considered in connection with the identification and selection by the processor 148 of the heat source at block 212. Moreover, the heat source can be identified in a variety of manners, including for example, based on a temperature of one or more particular heat loads 128 of, and/or of a corresponding portion of the first thermal fluid within, one or more of the thermal subsystems 110*a*, 110*b*. For example, according to certain embodiments, one criteria can be whether the thermal subsystem 110*a*, 110*b*, including one or more heat loads associated with a particular thermal subsystem 110*a*, 110*b* is in an active or inactive state, and/or a duration of time such a heat load(s) 128 has/have been active. Moreover, in at least certain instances, an inactive state can provide an indication to at least the processor 148 of whether the thermal subsystem 110*a*, 110*b* and/or the associated heat load(s) 128 is, or is not, generating heat that can assist in elevating the temperature of the second thermal fluid that will be delivered to the second air-side heat exchanger 116. Alternatively, or additionally, the processor 148 can receive information from one or more sensors 152*a*, 152*b* that can provide an indication of the temperature of the first thermal fluid flowing through the thermal subsystem 110*a*, 110*b* and/or the temperature of the heat load(s) 128. The processor 148 can use such temperature information to identify which thermal subsystem 110*a*, 110*b* and/or heat load(s) 128, or the corresponding portion of the first thermal fluid being heated therein, is to be used to heat the second thermal fluid that is to be delivered to the heat rejecting second air-side heat exchanger 116. According to certain embodiments, the processor 148 can utilize the highest current temperature as a basis for selecting a particular thermal subsystem 110*a*, 110*b*, heat load(s) 128, and/or first thermal fluid from a particular thermal subsystem 110*a*, 110*b* as the heat source that is to be used for heating the second thermal fluid. However, other, or additional, criteria can also be considered, including the quantity of available first thermal fluid in/for that thermal subsystem 110*a*, 110*b*, the impact the transfer for heat from the first thermal fluid from that particular thermal subsystem 110*a*, 110*b* or heat load 128 may have on the operation or heating, if needed, of that selected thermal subsystem 110*a*, 110*b* or heat source(s) 128, among other considerations.

Upon selecting a heat source for heating the second thermal fluid that is delivered to the second air-side heat exchanger 116, at block 214 the processor 148 can generate one or more signals to facilitate operation of either or both the first and second multi-mode valves 126, 140 so that the first thermal fluid from the selected heat source can flow to a location at which the heat entrained in the associated first thermal fluid is transferred to the second thermal fluid that is being supplied to the second air-side heat exchanger 116. For example, a second thermal subsystem 110*b* having a heat load 128 can be selected at block 212. According to such an example, the first multi-mode valve 126 can be operated, including adjusted, at block 216 such that at least a portion of the heated first thermal from the selected second thermal subsystem 110*b* fluid is diverted or otherwise flows to a heat rejecting heat exchanger so that the heat entrained in the first thermal fluid can be directly or indirectly transferred to second thermal fluid that is to be supplied to the second air-side heat exchanger 116. For instance, in the example shown in FIG. 1, the second thermal subsystem 110*b* utilizes a coolant as the first thermal fluid, while the second air-side heat exchanger 116 utilizes a refrigerant as the second thermal fluid. Thus, in this example, the first multi-mode valve 126 can be operated, such as, for example, in response to one or more signals generated by the processor 148, to direct heated first thermal fluid from the selected second thermal subsystem 110*b* to the second secondary heat exchanger 144, which in this example, can operate as a heat rejecting heat exchanger (e.g., a condenser). Similarly, the processor 148 can generate one or more signals to orient the second multi-mode valve 140 such that second thermal fluid, which in this example is refrigerant, flows through the first multi-mode heat exchanger 142, which in this instance can operate as a heat absorbing heat exchanger (e.g., an evaporator). Thus, heat entrained in the first thermal fluid delivered from the selected second thermal subsystem 110*b* can be transferred from the second secondary heat exchanger 144 to the second thermal fluid flowing through the first secondary heat exchanger 142 so as to increase the temperature of the second thermal fluid across the first secondary heat exchanger 142. In such an example, the second multi-mode valve 140 can further be oriented at block 214 such that the flow of the heated second thermal fluid that exits the first secondary heat exchanger 142 is directed towards the second air-side heat exchanger 116. Similarly, in this example, the first multi-mode valve 126 can be oriented at block 214 such that the cooled first thermal fluid outputted from the second secondary heat exchanger 144 is circulated back to the selected second thermal subsystem 110*b*, wherein the cooled first thermal fluid can again be reheated.

The heated second thermal fluid supplied to the second air-side heat exchanger 116 can then be used in connection with operating the second air-side heat exchanger 116 as a heat rejecting heat exchanger, as indicated by block 216. Accordingly, at least a portion of the heat being rejected from the second air-side heat exchanger 116 can at least assist with deicing, including preventing the formation of ice on, the second air-side heat exchanger 116. According to the illustrated embodiment, the second thermal fluid exiting the second air-side heat exchanger 116 can then flow back to the second multi-mode valve 140, which can be configured to return the cooled second thermal fluid to the first secondary heat exchanger 142 to again be reheated by heat transferred from heated first thermal fluid being supplied to the second secondary heat exchanger 144. However, the second thermal fluid exiting the second air-side heat exchanger 116 can also be recirculated in a variety of other manners.

As indicated by at least FIG. 4, in connection with the second mode of operation of the heat pump system 104, the first air-side heat exchanger 114 can operate as a heat absorbing heat exchanger. In such a situation, at least a portion of the heat being rejected by the second air-side heat exchanger 116 as the second air-side heat exchanger 116 is being deiced can be captured by the first air-side heat exchanger 114. The first multi-mode valve 126 can further be positioned to direct the at least partially heated first thermal fluid outputted from the first air-side heat exchanger 114 to a selected portion of the first thermal fluid portion 106, such as, for example, one of the first or second thermal subsystems 110*a*, 110*b*. Which portion of the first thermal fluid portion 106 is to receive the first thermal fluid outputted from the first air-side heat exchanger 114 can be based on a variety of different criteria, including, for example, based on a current priority to elevate the temperature of one or more components of the thermal subsystem 110*a*, 110*b*. For example, as the second mode of operation typically occurs in cold ambient temperatures, including, for example, when ambient temperatures are below the freezing temperature of water, the heat being recaptured by the first air-side heat exchanger 114 and transferred to the first thermal fluid passing through the first air-side heat exchanger 114 can be utilized in connection with at least attempting to warm the battery 120 to a threshold temperature associated with the battery 120 reaching battery performance targets. Thus, in such an example, the first multi-mode valve 126 can, at block 214, be configured such that at least partially heated first thermal fluid that exits the first air-side heat exchanger 114 can be directed to flow to the first, battery thermal subsystem 110*a* so as to provide heat that can be used to elevate the temperature of the battery 120. However, in other instances, selective operation of the first multi-mode valve 126 can also be utilized to use heat from first, battery thermal subsystem 110*a*, including, for example, from the battery 120 and/or an associated electric heater, to elevate a temperature of the first thermal fluid.

Additionally, as indicated by block 220 and the direction of the airflow 154 shown in FIG. 4, while the heat pump system 104 is operating in the second mode, the reversible impeller 118 can continue to be operated in a manner that circulates the airflow 154 in the first direction ("$d_1$") such that, relative to at least the general direction of travel of the airflow 154, the first air-side heat exchanger 114 is downstream of the second air-side heat exchanger 116. Again, such downstream positioning of the first air-side heat exchanger 114 can assist in the delivery and associated capturing by the first air-side heat exchanger 114 of heat that has been rejected by the second air-side heat exchanger 116.

At block 222, the processor 148 can determine whether the issues associated with the first trigger event, namely the formation, including predicted formation, of ice on the second air-side heat exchanger 116 has, or has not, been resolved. Whether such issues have been resolved can be based on a variety of information, including, for example, information provided by one or more sensors 152*a-d*, among other information. Moreover, the information used to determine whether such issues have been resolved at block 222 can be at least similar to the type of information used at block 210 to identify the presence or occurrence of the first trigger event. If the issue(s) associated with the first trigger event is determined by the processor 148 at block 222 to not have been resolved, such as, for example, ice remains on the second air-side heat exchanger 116, then operation of the heat pump system 104 in the second mode can continue until a determination can be made at block 222 that such issues have been resolved, including, for example, deicing of the second air-side heat exchanger 116 is complete. Additionally, or alternatively, the method 200 can return to block 212, where processor 138 can determine whether to change to a different heat source. For example, if a thermal subsystem 110*b* associated with a transmission system was initially used to provide heat for directly or indirectly elevating the temperature of the second thermal fluid in connection with operating the second air-side heat exchanger 116 as a heat rejecting heat exchanger, by returning to block 212, the processor 148 can determine whether to instead use heat from a different heat load 128 or thermal subsystem 110*b*, such as, for example, heat from a thermal subsystem 110*b* associated with one or more inverters, or, alternatively, a hydraulics system. If the processor 148 decides to change the heat source, then the method 200 can again include operating the first multi-mode valve 126 such that the first thermal fluid from the newly selected thermal subsystem 110*b*, and not the previously selected thermal subsystem 100*b*, can be diverted for use in a direct or indirect supply of heat to the second thermal fluid that is to be supplied to the second air-side heat exchanger 116. Thus, in this example, the processor 148 can generate one or more signals to adjust a configuration of the first multi-mode valve 126 such the thermal subsystem 110*b* associated with the hydraulics system, and not from the previously selected transmission system, is in fluid communication with the second secondary heat exchanger 144, thereby allowing heat in first thermal fluid from the hydraulics thermal subsystem 110*b* to be transferred to the second thermal fluid.

Figure 5:
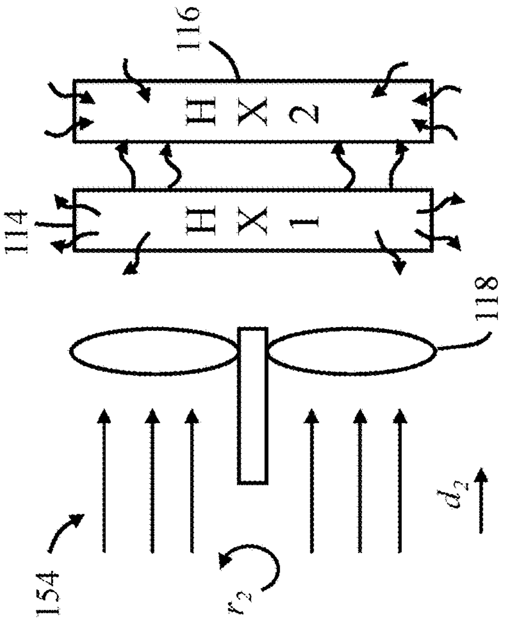
FIG. 5 illustrates a third mode of operation for the heat pump system shown in FIG. 3 in which the first air-side heat exchanger is operating as a heat rejecting heat exchanger, the second air-side heat exchanger is operating as a heat absorbing heat exchanger, and the reversible impeller is generally directing airflow in a second, reverse direction.

In certain situations, a determination that the first trigger event has been resolved at block 222 can also be accompanied with an identification of a second trigger event, as generally indicated by block 224. For example, during the second mode of operation of the heat pump system 104, in certain ambient conditions, while the first air-side heat exchanger 114 is operating as a heat absorbing heat exchanger (e.g., an evaporator), the temperature of at least an outer portion of the first air-side heat exchanger 114 can drop below ambient temperatures. In such situations, moisture, humidity, or condensation in the air or environment can result in the formation of ice on the first air-side heat exchanger 114 while the second air-side heat exchanger 116 is being deiced. Using various information, including information at least similar to that discussed above with respect to an identification of the first trigger event at block 210, the processor 148 can determine, including predict, such a formation, or anticipated formation, of ice on the first air-side heat exchanger 114 at block 224. In response to such a determination that the first air-side heat exchanger 114 is, or is anticipated to experience within a predetermined time period, a formation of ice on the first air-side heat exchanger 114, the heat pump system 104 can be operated in a third mode of operation, as generally indicated by FIG. 5.

The third mode of operation of the heat pump system 104 can generally be similar to the second mode of operation, except, in an attempt to deice the first air-side heat exchanger 114, the first air-side heat exchanger 114 can operate as a heat rejecting heat exchanger. Additionally, in the third mode of operation, the second air-side heat exchanger 116 can be operated as a heat absorbing heat exchanger so as to at least attempt to recover heat rejected by the first air-side heat exchanger 114. Additionally, the reversible impeller 118 can operate to facilitate airflow 154 in a second, reverse direction (as generally indicated by "$d_2$" in FIGS. 1 and 5), the second direction ("$d_2$") being opposite to the first direction ("$d_1$") discussed above with respect to at least FIGS. 1 and 3. For example, with respect to embodiments in which the reversible impeller 118 is a fan, the blades of the fan can rotate in a second rotational direction (as generally indicated by "$r_2$" in FIG. 5), the second rotational direction ("$r_2$") being opposite to the first rotational direction ("$r_1$") discussed above with respect to at least FIG. 3. By reversing the direction of the airflow 154 via operation of the reversible impeller 118, the second air-side heat exchanger 116 can, with respect to the general direction of the airflow 154, be downstream of the first air-side heat exchanger 114. Such downstream positioning during the third operational mode of the heat pump system 104 can assist in the second air-side heat exchanger 116 in capturing heat being rejected upstream of the second air-side heat exchanger 116 by the first air-side heat exchanger 114.

Accordingly, if the processor 148 determines at block 226 that there is ice, or there is a potential for the formation of ice within a predetermined time period, on the first air-side heat exchanger 114, then at block 226 the processor 148 can identify and select the heat source that can directly, or indirectly, provide heat for heating the first thermal fluid being supplied to the first air-side heat exchanger 114. Such identification and selection of a heat source by the processor 148 at block 226, including the criteria used for such a selection and identification, can be similar to the one or more of the manners for identifying and selecting a heat source that are discussed above with respect to block 212.

In the illustrated example, upon selection of a heat source at block 226, at block 228 the processor 148 can generate one or more signals to adjust the first multi-mode valve 126 such that the first thermal fluid that is being, or has been, directly or indirectly heated by the selected heat source can flow through the first multi-mode valve 126 and to the first air-side heat exchanger 114. Alternatively, according to other embodiments, the heat in the first thermal fluid can be transferred to another portion, or other type, of first thermal fluid before being supplied to the first air-side heat exchanger 114. Such heat provided by the first thermal fluid to the first air-side heat exchanger 114 can thereby be utilized in connection with the first air-side heat exchanger 114 being operated as a heat rejecting heat exchanger in at least an attempt to deice the first air-side heat exchanger 114, as indicated by block 230.

Additionally, as indicated by block 232, while the first air-side heat exchanger 114 is rejecting heat, the second air-side heat exchanger 116 is being operated as a heat absorbing heat exchanger that at least attempts to recover a portion of the heat rejected by the first air-side heat exchanger 114. Accordingly, the second multi-mode valve 140 can, at block 228, be configured, such as, for example, in response to one or more signals generated by the processor 148, to deliver at least partially heated second thermal fluid outputted from the second air-side heat exchanger 116 to a select location. For example, in at least certain instances, the at least partially heated second thermal fluid flowing out of the second air-side heat exchanger 116 can be directed, via at least the configuration of the second multi-mode valve 140, to the HVAC condenser 132, wherein heat from the at least partially heated second thermal fluid can be used by the HVAC system 127 to elevate the air temperature within the cabin 129.

As indicated by block 234, and as shown by at least FIG. 5, with the second air-side heat exchanger 116 attempting to recover at least a portion of the heat being rejected by the first air-side heat exchanger 114, the reversible impeller 154 can be operated so as to facilitate airflow in the second, reverse direction ("$d_2$"). Thus, according to embodiments in which the reversible impeller 118 is a reversible fan, the blades of the fan can be rotated in the second rotational direction such that, relative to the direction of resulting airflow 154, the second air-side heat exchanger 116 is downstream of the first air-side heat exchanger 114. As previously discussed, such downstream positioning of the second air-side heat exchanger 116 can assist the second air-side heat exchanger 116 in recovering at least a portion of the heat that is rejected by the first air-side heat exchanger 114.

While the heat pump system 104 is operating in the third mode, the processor 148 can monitor the status of the deicing of the first air-side heat exchanger 114, as generally indicated by block 236. Moreover, the determination made at block 236 with respect to the deicing of the first air-side heat exchanger 114 can be similar to the above-discussed decision at block 222 regarding the deicing of the second air-side heat exchanger 114. Thus, the determination at block 236 can include considerations similar to those discussed above with respect to block 236, but in regard to the icing or deicing status of the first air-side heat exchanger 114 rather than the second air-side heat exchanger 116. Further, in the event the processor 148 determines at block 236 that the third mode of operation is to continue, then similar to the determination made with regard to block 222, the method 200 can return block 226, and the processor 148 can determine whether a different heat source is to be selected for providing heat to the first thermal fluid that is supplied to the first air-side heat exchanger 114 while the first air-side heat exchanger 114 continues to operate as a heat rejecting heat exchanger. If a different heat source is selected, the method can again, at block 228, adjust at least the configuration of the first multi-mode valve 126, such as, for example, in response to one or more signals generated by the processor 148, such that heated first thermal fluid from the newly selected heat source flows to the first air-side heat exchanger 114 or to a location where heat in the heated first thermal fluid can be directly or indirectly transferred to the portion of the first thermal fluid that is supplied to the first air-side heat exchanger 114.

If the processor 148 determines at block 236 that deicing of the first air-side heat exchanger 114 is complete, the method 200 can determine, including predict, whether the second air-side exchanger 116 is again experiencing, or anticipated to be experiencing, icing. For example, during at least certain ambient conditions, as a consequence of acting as a heat absorbing heat exchanger (e.g., evaporator) during the third mode of operation, the second air-side exchanger 116 may again begin to form, or be at risk of forming, ice. Thus, the determination at block 236 by the processor 148, including the information considered by the processor 148, can be similar to determination made by the processor 148 at above-discussed block 210. Therefore, similar to block 210, block 236 can also involve determining whether another first trigger event similar to the above-discussed first trigger event has again occurred, or is anticipated to reoccur. If the processor 148 determines at block 236 that another first trigger event has occurred, or is anticipated to occur, then the method 200 can return to block 214.

If, however, the processor 148 determines at block 238 that the second air-side heat exchanger 116 is not experiencing, or is not currently anticipated to experience, formation of ice, then at block 240 the reversible impeller 118, and, moreover the fan, can be returned to rotating the first rotational direction such that the airflow 154 is again in the first direction ("$d_1$"). Additionally, at block 242, the processor 148 can determine, for each of the first and second air-side heat exchangers 114, 116, whether the heat exchanger 114, 116 is to operate as a heat absorbing heat exchanger, a heat rejecting heat exchanger, or be inactive. Such a determination at block 242 can also guide the processor 148 as to the configuration of the first and second multi-mode valves at block 242, including which other portion, if any, of the first thermal fluid portion 106 is to be in fluid communication with the first air-side heat exchanger 114, and which, if any, other portion of the second thermal fluid portion 108 is to be in fluid communication with the second air-side heat exchanger 116.

At block 244, at least the processor 148 can continue to monitor the thermal management system 100 for any indication of the formation, including predicted formation, of ice on either, or both, of the first and second air-side heat exchangers 114, 116. Moreover, the processor 148 can monitor for the detection of a first or second trigger event, as discussed above for example with respect to at least blocks 210, 224, and 236, and if detected, facilitate the occurrence of the appropriate actions to deice that identified air-side heat exchanger 114, 116, as also discussed above. This process of continuing to monitor for an occurrence, or reoccurrence, of either or both the first and second trigger events can generally continue at least until the thermal management system is deactivated at block 246, such as, for example, in response to the associated vehicle being placed in an off condition.

Figure 6:
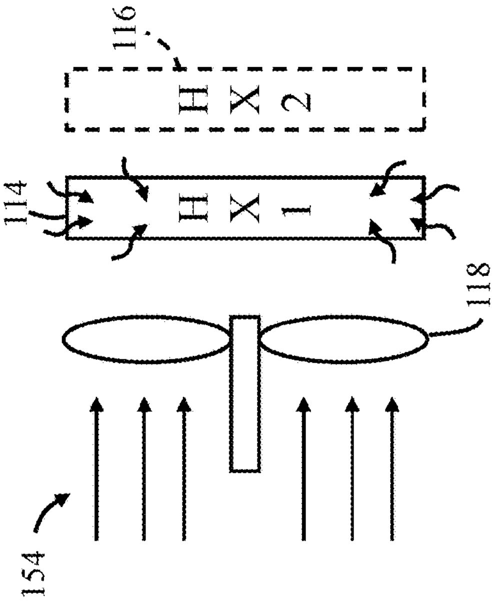
FIG. 6 illustrates a fourth mode of operation for the heat pump system shown in FIG. 3 in which the first air-side heat exchanger is operating as a heat absorbing heat exchanger, the second air-side heat exchanger is inactive, and the reversible impeller is directing airflow in the second, reverse direction.

FIG. 6 illustrates a fourth mode of operation for the heat pump system 104 shown in FIG. 3 in which the first air-side heat exchanger 114 is operating as a heat absorbing heat exchanger, the second air-side heat exchanger 116 is inactive, and the reversible impeller 118 is directing airflow 154 in the second, reverse direction ("$d_2$"). The fourth mode of operation can be utilized in variety of situations, such as, for example, when the vehicle is operating in moderate ambient temperatures, including temperatures above, including just outside of, the freezing temperature of water. As shown, when operating in the fourth mode, the first air-side heat exchanger 114 can be operating as a heat absorbing heat exchanger (e.g., an evaporator), while the second air-side heat exchanger 116 is inactive (as indicated by the broken lines for the second air-side heat exchanger 116). Accordingly, while in the fourth mode, the thermal management system may not actively be seeking to deice the first air-side heat exchanger 114. Thus, in such a situation, the first air-side heat exchanger 114 can be operated to heat at least a portion of the first thermal fluid flowing through the first air-side heat exchanger 114. The heat drawn into the first thermal fluid via use of the first air-side heat exchanger 114 can be utilized by one or more of the thermal subsystems 110*a*, 110*b*, including, for example, in connection with elevating the temperature of the battery 120 or one or more other heat loads 128.

Figure 7:
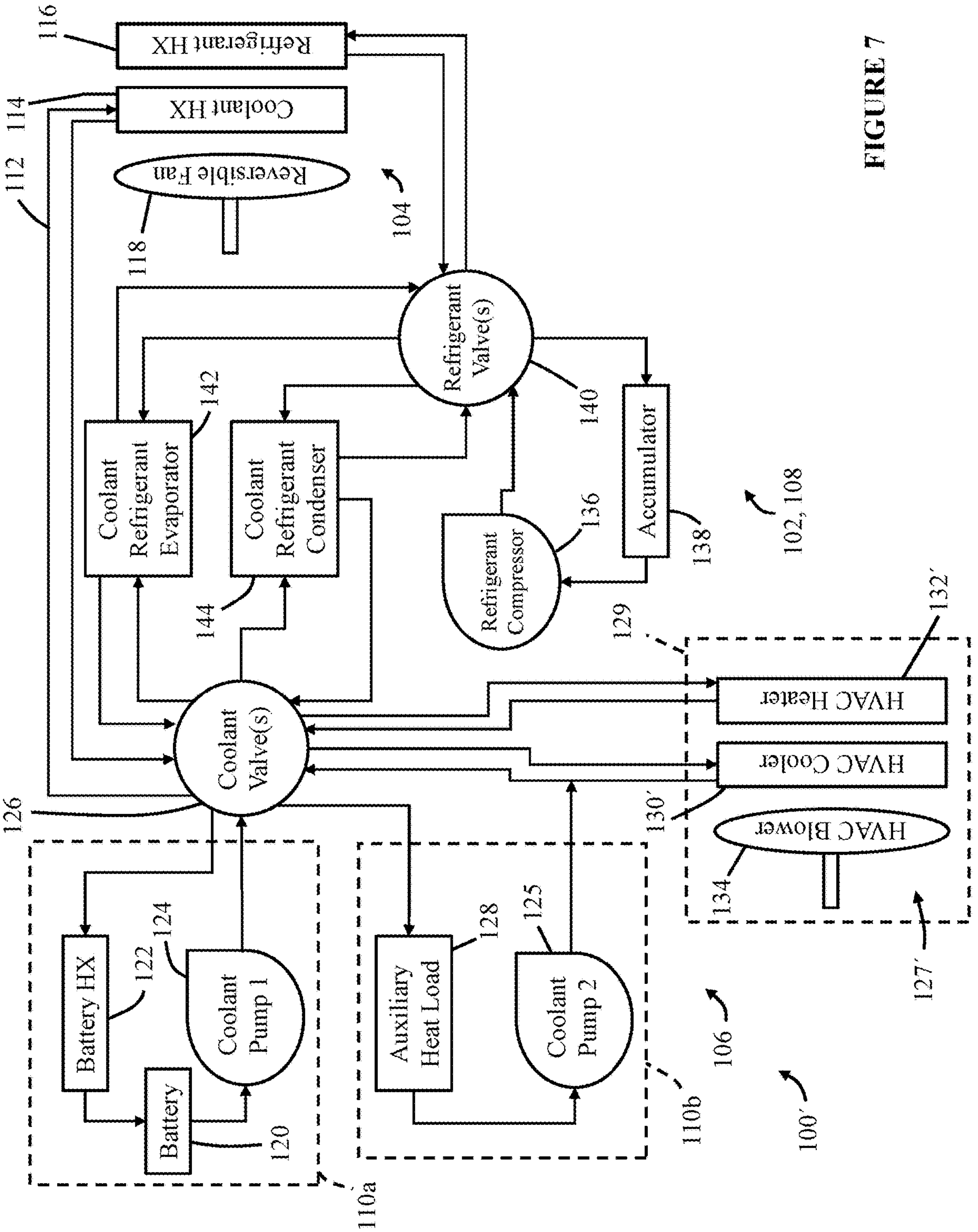
FIG. 7 illustrates a simplified representation of an exemplary thermal management system having a heat pump system and a first thermal fluid-based HVAC system for the cabin of the vehicle.

FIG. 7 illustrates a simplified representation of an exemplary thermal management system 100' having a heat pump system 104. Unlike the second thermal fluid (e.g., refrigerant) based HVAC system 127 shown in FIG. 1, the thermal management system 100' shown in FIG. 7 utilizes a first thermal fluid-based HVAC system 127' for the cabin 129 of the vehicle. Thus, the first multi-mode valve 126 for the thermal management system 100' shown in FIG. 7 is additionally utilized to control a flow of first thermal fluid to the HVAC system 127', and, moreover, to a HVAC cooler 130' and an HVAC heater 132' of the HVAC system 127'. Thus, according to embodiments in which the first thermal fluid is a coolant and the second thermal fluid is a refrigerant, the first thermal fluid-based HVAC system 127' utilizes the HVAC cooler 130' and an HVAC heater 132' for heat transfer relating to the first thermal fluid, rather than the HVAC evaporator and condenser 130, 132 (FIG. 1) utilized with the previously discussed second thermal fluid based HVAC system 127. Yet, regardless of whether the HVAC system 127, 127' is refrigerant or coolant based, and thus whether thermal fluid is directed to the HVAC system 127, 127' via the first or second multi-mode valve 126, 140, the manner in which the thermal management system 100, 100' operates in the various above-discussed modes is generally the same. Moreover, the manner in which one of the first and second air-side heat exchangers 114, 116 is operated for deicing that heat exchanger 114, 116, the associated selection of a heat source for such deicing, the use of the other of the first and second air-side heat exchangers 114, 116 to recover heat from the other air-side heat exchanger 114, 116 undergoing deicing, and the selection of the direction at which the reversible impeller 118 generally directs the airflow can generally remain similar to that discussed above with respect to FIGS. 2A and 2B.

Figure 8:
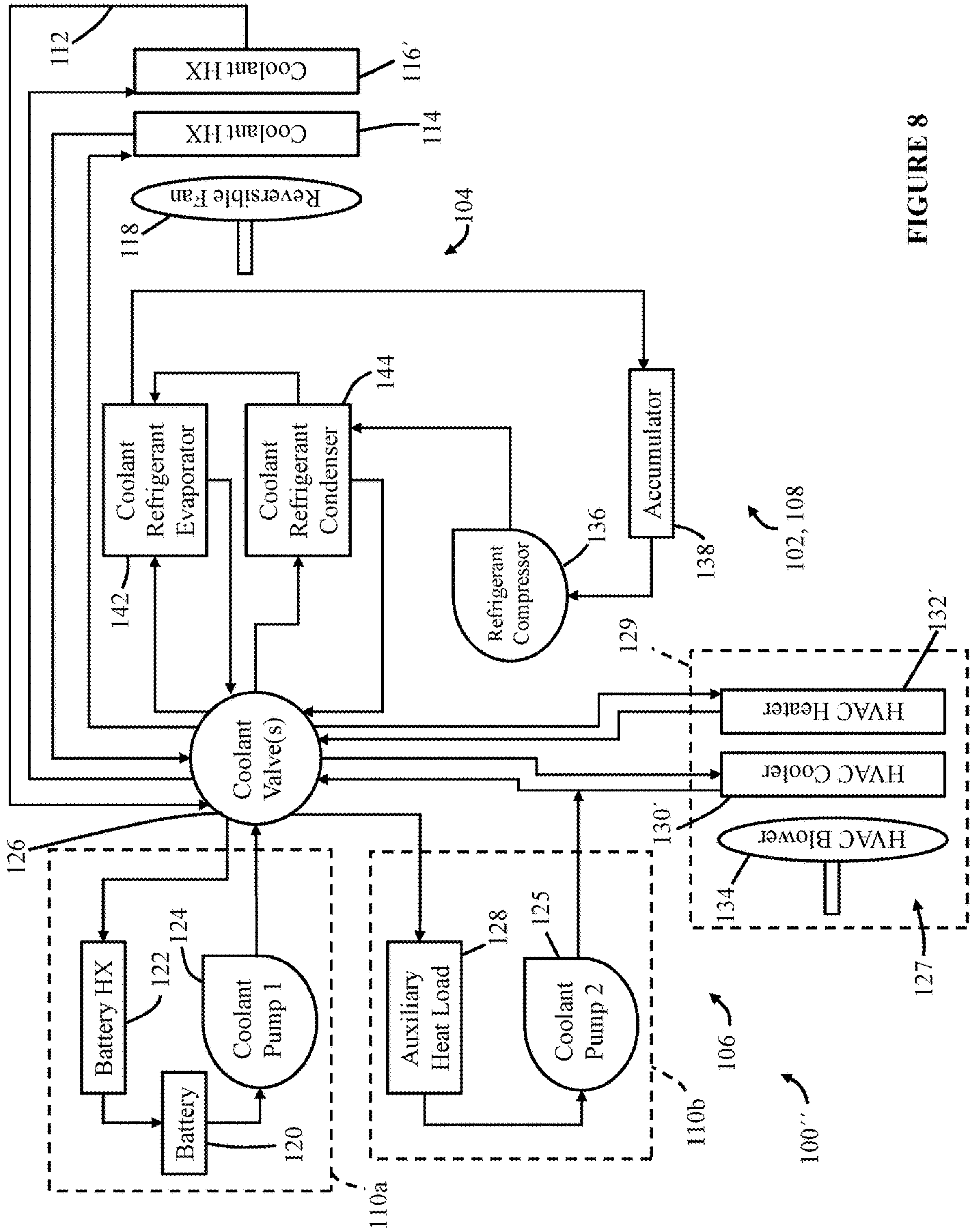
FIG. 8 illustrates a simplified representation of an exemplary first thermal fluid based thermal management system having a heat pump system and a first thermal fluid-based HVAC system for the cabin of the vehicle.

FIG. 8 illustrates a simplified representation of an exemplary first thermal fluid based thermal management system 100''' having a heat pump system 104 and a first thermal fluid-based HVAC system 127" for the cabin 129 of the vehicle. Compared to the thermal fluid management systems 100, 100' shown in FIGS. 1 and 7, FIG. 8 illustrates an embodiment of the thermal management system 100" having a simplified second thermal fluid portion 108. For example, the second thermal fluid portion 108 shown in FIG. 8 does not include the second multi-mode valve 140, and the second air-side heat exchanger 116' is a first thermal fluid (e.g., coolant) based heat exchanger. Thus, while the second thermal fluid portion 108 is simplified in FIG. 8, the thermal management system 100" utilizes a more complex version of the first multi-mode valve 126, as the first multi-node valve 126 in FIG. 8 is configured to control flow of first thermal fluid to the thermal subsystems 110*a*, 110*b*, first and second air-side heat exchangers 114, 116', the secondary heat exchangers 142, 144, and the HVAC system 127". Yet, again the process of operating one of the first and second air-side heat exchangers 114, 116' as a heat rejecting heat exchanger while the other of the first or second air-side heat exchangers 114, 116' operates as a heat absorbing heat exchanger, selectively utilizing a heat source in connection with operating such a heat rejecting heat exchanger, and selectively operating the reversible impeller 118 in one of a forward or reverse direction generally remains the same.

Figure 9:
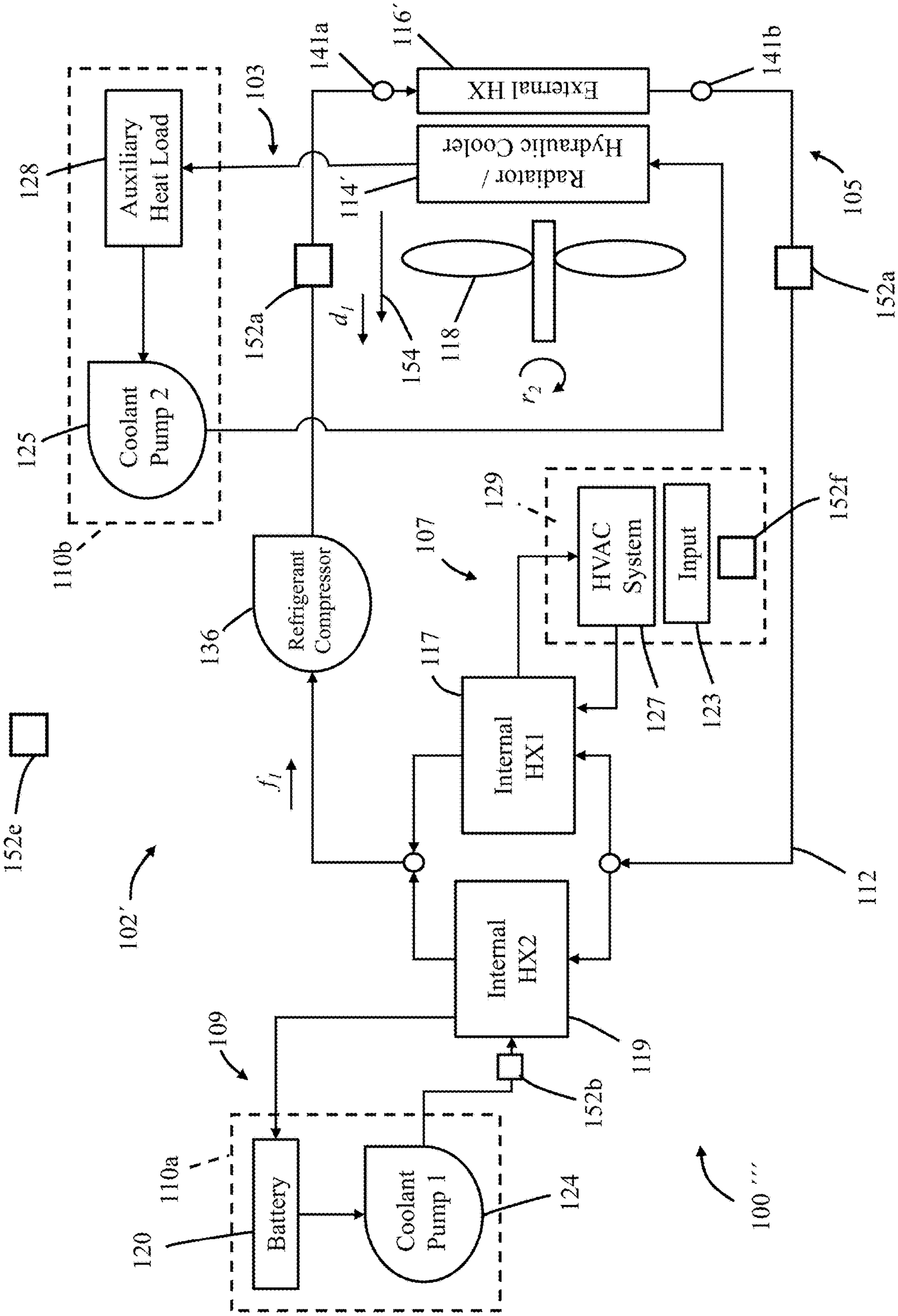
FIG. 9 illustrates a simplified representation of a thermal management system operating in a first, air-conditioning mode in which an impeller is facilitating an airflow across first and second air-side heat exchangers in a first direction.

FIG. 9 illustrates a simplified representation of a thermal management system 100''' operating in a first, air-conditioning mode in which the impeller 118 is facilitating an airflow 154 across first and second air-side heat exchangers 114', 116' in a first direction (as generally indicated by "$d_1$" in FIG. 9). Although not shown for purposes of illustration, the illustrated thermal management system 100''' can include one or more components similar to those discussed above, including, for example, the controller 146, including the associated one or more processors 148 and memory devices 150. Additionally, as with other embodiments discussed herein, the simplified illustrated thermal management system 100''' can include a variety of other components in addition to, or in lieu of, those illustrated in FIG. 9, including, for example, expansion valves, release valves, and filters, among other components. Further, the fluid circuit 102' is generally shown as having conduits 112 through which thermal fluid(s) for different fluid loops 103, 105, 107, 109 can flow. Such conduits 112 can comprise tubes, pipes, and/or hoses, as well as combinations thereof, and the associated fittings and couplings, among other components.

As shown, the thermal management system 100''' can include first and second air-side heat exchangers 114', 116' that are similar to those discussed above. For example, as illustrated, the first and second air-side heat exchangers 114', 116' can be arranged in a stacked configuration in which the second air-side heat exchanger 116', which can also be referred to as an external heat exchanger ("External HX") is closer to the outside, ambient environment than the first air-side heat exchanger 114'. A variety of different types of heat exchangers can be utilized for the first and second air-side heat exchangers 114', 116', and the type of heat exchanger utilized for the first air-side heat exchanger 114' may, or may not, be the same as the type of heat exchanger used for the second air-side heat exchanger 116'.

As also illustrated, the thermal management system 100''' includes a fluid circuit 102" having a plurality of fluid loops 103, 105, 107, 109 through which similar and/or dissimilar thermal fluids may flow. The types of thermal fluids flowing through the different fluid loops 103, 105, 107, 109 can be based on a variety of different criteria, including, for example, the associated load(s) that are part of the particular fluid loop 103, 105, 107, 109.

The illustrated fluid circuit 102' shown in FIG. 9 includes a first fluid loop 103 that can include one or more thermal subsystems 110*b* that are fluidly coupled to the first air-side heat exchanger 114'. The one or more thermal subsystems 110*b* can utilize the first thermal fluid to control the temperature of one or more heat loads 128, such as, for example, a hydraulics system(s) of the vehicle, as previously discussed, and can utilize the second fluid pump 125 (identified in FIG. 9 as "Coolant Pump 2") to assist in the circulation of the first thermal fluid about the first fluid loop 103. According to such an exemplary embodiment, the first air-side heat exchanger 114' can, for example, be a radiator or hydraulic cooler, as indicated by FIG. 9.

The second fluid loop 105 can, according to certain embodiments, be a refrigerant loop that can include the second air-side heat exchanger 116'. Thus, according to the illustrated embodiment, the second fluid loop 105 can include the compressor 136, the second air-side heat exchanger 116', and one or more internal heat exchangers 117, 119, among other components. One or more temperature sensors 152*a* can also be positioned about the second fluid loop 105 to provide information to the controller 146 indicating, or used to determine, a temperature of the second thermal fluid, which, in this example, can be a refrigerant, that can generally continuously be circulating through the second fluid loop 105. While FIG. 9 illustrates a pair of temperature sensor 152*a*, the number and location(s) of the temperature sensor 152*a* can vary.

The second fluid loop 105 can also include one or more valves 141*a*, 141*b* that can be communicatively coupled to the controller 146, and which are configured to at least assist in controlling and/or changing a direction of flow of the second thermal fluid within the second fluid loop 105. The valves 141*a*, 141*b* can thus be positioned at locations within the second fluid loop 105 that can assist in controlling and/or managing the direction of flow of the second thermal fluid about the second fluid loop 105. Moreover, the valves 141*a*, 141*b* can be configured to, in response to a signal generated by the controller 146, at least assist in changing a direction of flow of the second thermal fluid in connection with the controller 146 adjusting the thermal management system 100''' from operating different operational modes such as, for example, operating in a first, air conditioning (AC) mode and a second, heat pump mode, as discussed below. For example, the controller 146 can monitor various thermal parameters via temperature sensors 152*a*, 152*b*, 152*c*, 152*f*, among other information, and can send control signals to the valves 141*a*, 141*b* to adjust an operation of the valves 141*a*, 141*b* in a manner that can at least in changing a direction of flow of the second thermal fluid. As discussed, such control in the flow direction of the second thermal fluid can be utilized in connection with selectively operating the second air-side heat exchanger 116' as either a condenser or evaporator based on the thermal management needs of the thermal management system 100'''.

As seen in at least FIG. 9, the second fluid loop 103 can include either or both a first internal heat exchanger 117 and a second internal heat exchanger 119. In the illustrated embodiment, the first and second internal heat exchangers 117, 119 are arranged in parallel such that a portion of second thermal fluid can be diverted to the first internal heat exchanger 117, while another portion of the second thermal fluid can instead be diverted to the second internal heat exchanger. However, the first and second internal heat exchangers 117, 119 can be arranged in other manners, including, but not limited to, being in parallel with each other.

In addition to being part of the second fluid loop 105, the first and second internal heat exchangers 117, 119 can also be part of other fluid loops 107, 109. For example, the first internal heat exchanger 117 can also be part of a third fluid loop 107 of the fluid circuit 102'. Moreover, the first internal heat exchanger 117 can be configured to transfer heat between the second thermal fluid of the second fluid loop 105 and a third thermal fluid of the third fluid loop 107. Additionally, according to embodiments in which the associated vehicle has a cabin 129, the third fluid loop 107 can part of, or fluidly coupled to, an HVAC system 127, such as, for example, an HVAC system 127 similar to that discussed above with respect to at least FIG. 7. Thus, according to certain embodiments, the third thermal fluid can be utilized in connection with the heating and/or cooling an air temperature of the cabin 129, if any, of the vehicle.

As also seen in FIG. 9, the cabin 129 can include one or more temperature sensors **152*f* that can provide information to the controller 146 regarding the air temperature within the cabin 129. As also seen in FIG. 9, according to certain embodiments, the cabin 129 can further include an input device 123, such as, for example, a touch screen, button, dial, switch, and/or slide, among other input devices, that an operator of the vehicle can use to set, or select, a desired air temperature for the cabin 129. According to such an embodiment, the input device 123 can be communicatively coupled to the controller 146 such that the controller 146** can receive information indicative of the cabin temperature settings inputted by the operator.

The fourth fluid loop 109 is fluidly coupled to the first thermal subsystem **110*a*. Moreover, in the embodiment illustrated in FIG. 9, the fourth fluid loop 109 can use a fourth thermal fluid of the fourth fluid loop 109 to control a temperature of one or more batteries 120 of the first thermal subsystem 110*a*. In the illustrated embodiment, the second internal heat exchanger 119 is fluidly coupled to both the second and fourth fluid loops 105, 109 such that heat can be transferred between the second and fourth thermal fluids at the second internal heat exchanger 119. Additionally, as illustrated, the fourth fluid loop 109 can include the first fluid pump 124, which can assist in circulating the fourth thermal fluid about the fourth fluid loop 109. The first thermal subsystem 110*a* can also be equipped with a temperature sensor 152*b* that is communicatively coupled to the controller 146, and which provides information indicating to, or used to determine by, the controller 146 a temperature of the fourth thermal fluid. While FIG. 9 illustrates a single temperature sensor 152*b* being used with the fourth fluid loop 109, the number and locations of temperature sensor(s) 152*b* along the fourth fluid loop 109** can vary.

According to certain embodiments, the thermal management system 100''' can also include an ambient temperature sensor **152*e* that can generally provide information to the controller 146 indicative of an outside, ambient temperature. However, the controller 146** can receive ambient temperature information in a variety of other manners.

Figure 10:
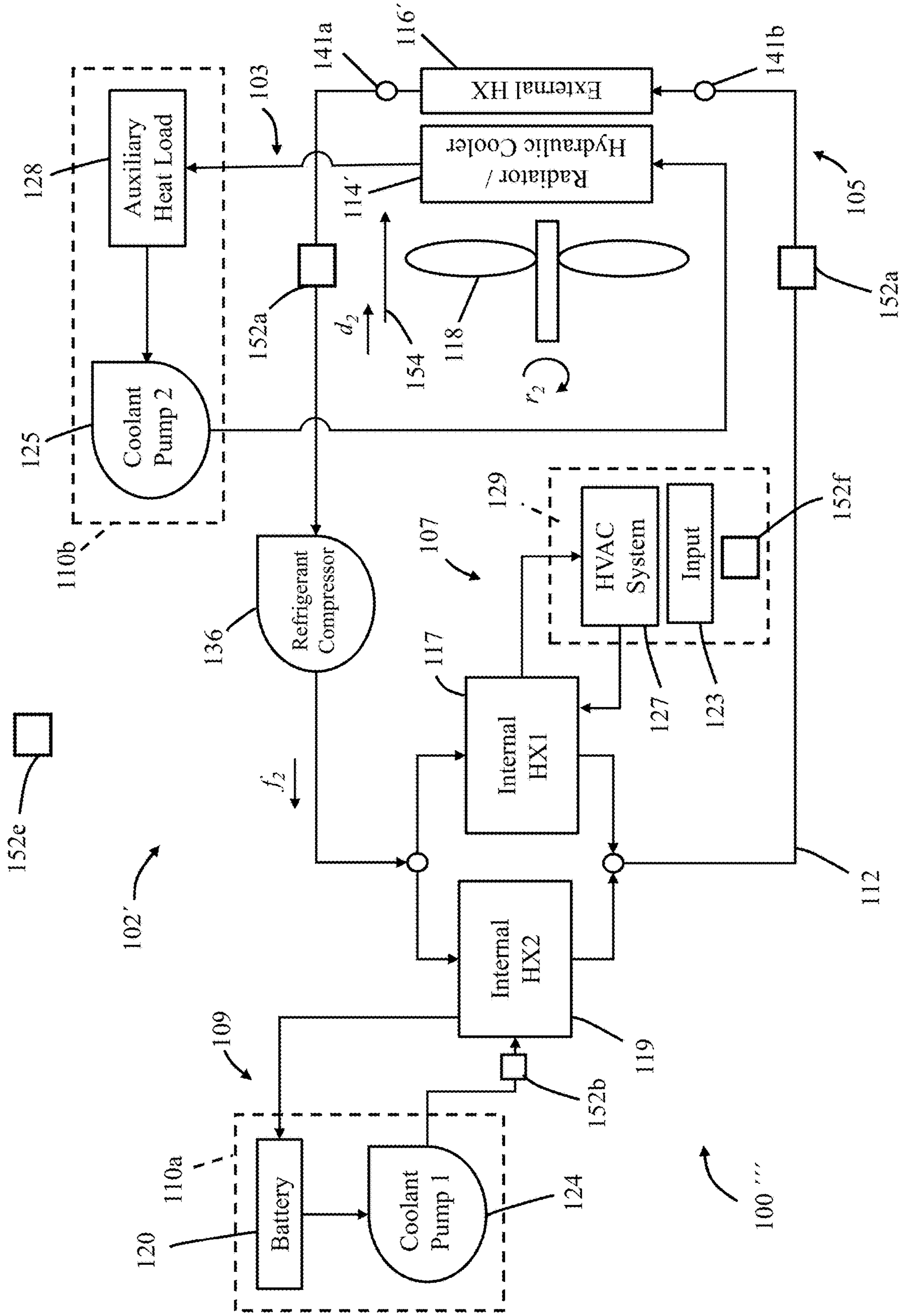
FIG. 10 illustrates the thermal management system shown in FIG. 9 operating in a second, heat pump mode in which the impeller is facilitating the airflow across first and second air-side heat exchangers in second, reverse direction.

The thermal management system 100''' is configured to operate in the first, AC mode (FIG. 9) and a second, heat pump mode (FIG. 10). When the thermal management system 100''' is operating in the first, AC mode, the second thermal fluid flowing through the second fluid loop 105 can be utilized to at least cool the third and/or fourth thermal fluids flowing through the third and fourth fluid loops 107, 109 at the corresponding first and second internal heat exchanger 117, 119, respectively. Thus, in the first, AC mode, the second air-side heat exchanger 116' can be operated as condenser that seeks to release heat from the second thermal fluid. Additionally, when the thermal management system 100''' is operating in the first, AC mode, the first air-side heat exchanger 114' can be operated as a radiator or a cooler that is releasing heat from the first thermal fluid.

In the first, AC mode, the impeller 118 can operate in a manner that facilitates an airflow 154 of ambient air drawn into the thermal management system 100''' to flow in the first direction ($d_1$). As previously discussed, according to certain embodiments in which the impeller 118 is a fan, operation of the thermal management system 100''' in the first, AC mode can involve the fan rotating in a first rotational direction ($r_1$). When the airflow 154 of ambient air is flowing in the first direction ($d_1$), the ambient air flows over the second air-side heat exchanger 116' before flowing over the first air-side heat exchanger 114'. By directing the airflow 154 to first flow over the second air-side heat exchanger 116', the airflow 154 can engage in a transfer of heat with the second air-side heat exchanger 116' before reaching the first air-side heat exchanger 114'. As a consequence, the temperature of the ambient air in the airflow 154 flowing over, including around, the second air-side heat exchanger 116' can have a cooler temperature then when the airflow 154 subsequently reaches the first air-side heat exchanger 114'. Accordingly, such an operation of the impeller 118 can facilitate the ambient air that flows over the second air-side heat exchanger 116' being colder than when the ambient air subsequently flows over the first air-side heat exchanger 114'. As the second thermal fluid can be a refrigerant, the exposure of the second air-side heat exchanger 116' to the colder ambient airflow 154 can be beneficial with respect to at least potential thermal sensitives of the refrigerant flowing through the second air-side heat exchanger 116', particularly in comparison to similar thermal characteristics of the first thermal fluid that is flowing through the first air-side heat exchanger 114'.

Accordingly, with the thermal management system 100''' operating in the first, AC mode, the second thermal fluid can flow in the first flow direction (as generally indicated by "$f_1$" in FIG. 9) about the second fluid loop 105. Thus, when flowing in the first flow direction ($f_1$), the second thermal fluid can, after passing through the compressor 136, flow downstream to the second air-side heat exchanger 116', which, again, is operating as a condenser that releases heat from the second thermal fluid. By operating as a condenser when the thermal management system 100''' is operating in the first, AC mode, heat entrained in the second thermal fluid can be released to the ambient air airflow 154 at the second air-side heat exchanger 116', thereby cooling the temperature of the second thermal fluid. The cooled second thermal fluid outputted from the second air-side heat exchanger 116 can subsequently flow from the second air-side heat exchanger 116' to either or both the first and second internal heat exchangers 117, 119.

According to embodiments in which the vehicle includes an operator cabin 129, the first internal heat exchanger 117 can, when the thermal management system 100''' is operating in the first, AC mode, operate as an evaporator. Thus, at the first internal heat exchanger 117, heat can be transferred from the third thermal fluid to at least a portion of the second thermal fluid, thereby reducing a temperature of the third thermal fluid while increasing the temperature of the second thermal fluid. The cooled third thermal fluid leaving the first internal heat exchanger 117 can be provided to at least the HVAC system 127 to assist with reducing, or maintaining, an air temperature within the cabin 129. Moreover, at the HVAC system 127, heat can be transferred to the cooled third thermal fluid, thereby heating the third thermal fluid. The heated third thermal fluid can then be recirculated to the first internal heat exchanger 117, where heat from the third thermal fluid can again be transferred to the second thermal fluid.

At least a portion of the cooled second thermal fluid can also flow downstream from the second air-side heat exchanger 116' to the second internal heat exchanger 119, which, in the first, AC mode, can operate as a chiller. At the second internal heat exchanger 119, heat can be transferred from the fourth thermal fluid to the second thermal fluid, thereby reducing a temperature of the fourth thermal fluid and increasing the temperature of the second thermal fluid. The reduction in the temperature of the fourth thermal fluid from the heat exchange that occurs at the second internal heat exchanger 119 can assist at least the fourth thermal fluid of the fourth fluid loop 109 with the thermal management of the temperature of the one or more batteries 120. Moreover, heat from the battery 120 can be transferred to heat the fourth thermal fluid, and the heated fourth thermal fluid can be recirculated back to the second internal heat exchanger 119 for a transfer again of heat from the fourth thermal fluid to the second thermal fluid.

The heated second thermal fluid outputted from the first and/or second internal heat exchangers 117, 119 can subsequently flow downstream to the compressor 136 before being returned to the second air-side heat exchanger 116', at which heat can again be transferred from the second thermal fluid to the ambient air airflow 154. Further, the second thermal fluid can generally continuously be circulated through the second fluid loop 105 as the thermal management system 100''' operates in the first, AC mode.

In certain situations, ambient temperatures, temperatures of at least certain thermal fluids of the fluid circuit 102', and/or temperatures of the loads (e.g., the auxiliary heat load(s) 128 and/or battery(ies) 120, etc.) may drop to levels that may adversely impact the performance of the thermal management system 100''' and/or associated loads. For example, operation of the battery 120 may be adversely impacted when the battery 120 is at relatively low temperatures. Traditionally, approaches to addressing such low temperatures have included providing the thermal management system 100''' with one or more electric heaters that can selectively increase the temperature of one or more of the thermal fluid(s). However, such electric heaters are typically powered by electrical energy stored by the battery(ies) 120. Thus, with respect to at least electric vehicles, depletion of electrical power stored by the battery(ies) 120 for operation of an electric heater can adversely impact the availability of electrical power from the battery 120 for other operations of the vehicle. However, operation of the thermal management system 100''' in the second, heat pump mode can provide a manner in which the temperature of at least some thermal fluids and/or loads, including batteries 120, can be elevated without reliance of an operation of an electric heater, thereby conserving at least some of the electrical power stored by the battery(ies) 120.

FIG. 10 illustrates an exemplary embodiment of the thermal management system 100''' operating in the second, heat pump mode. Operation of the thermal management system 100''' in the second, thermal pump mode can be triggered in a variety of manners. For example, according to certain embodiments, the controller 146 can have the thermal management system 100''' operate in the second, heat pump mode, in response to information provided by one or more temperature sensors **152*a*, 152*b*, 152*e*, 152*f* that may provide an indication of the temperature of one or more thermal fluids within the fluid circuit 102', temperature of a load(s), and/or an outside ambient temperature. According to certain embodiments, information provided to the controller 146 by the temperature sensors 152*a*, 152*b*, 152*e*, 152*f* can be evaluated by the controller 146, including, for example, with respect to one or more predetermined temperature thresholds to determine if the thermal management system 100''' is to be operated in the second, heat pump mode. Such predetermined temperature thresholds can be identified, set, or selected in a variety of manners, including, for example, via use of one or more lookup tables, algorithms, or models, be a default setting(s), and/or set by an operator, as well as various combinations thereof, among other manners of providing a predetermined temperature threshold. Additionally, or alternatively, determination by the controller 146 of whether to operate the thermal management system 100''' in the second, heat pump mode can be at least partially based on information inputted by an operator, including, for example, via use of the input device 123 in selecting, including setting, an air temperature for the cabin 129**.

If the controller 146 determines the thermal management system 100''' is to operate in the second, heat pump mode, the controller 146 can generate one or more signals to facilitate an operation of the impeller 118 in a manner in which the impeller 118 facilitates the airflow 154 to flow in a second, reverse direction (as indicated by "$d_2$" in FIG. 10). As shown by a comparison of FIGS. 9 and 10, the second direction ($d_2$) of the airflow 154 is generally opposite to the first direction ($d_1$) discussed above with respect to FIG. 9 and the first, AC mode. Moreover, the second direction ($d_2$) of the airflow 154 can facilitate the passage of the airflow 154 over the first air-side heat exchanger 114' before the airflow 154 passes over the second air-side heat exchanger 116'. As the first air-side heat exchanger 114' is operated to transfer heat from the first thermal fluid of the first fluid loop 103 at the first air-side heat exchanger 114' in both the first, AC mode and the second, heat pump mode, by first flowing over the first air-side heat exchanger 114', the temperature of the airflow 154 can increase before the airflow 154 reaches the second air-side heat exchanger 116'. The second air-side heat exchanger 116' however can, in the second, heat pump mode, operate as an evaporator wherein the second air-side heat exchanger 116' is operated to recapture heat that has been transferred by the first air-side heat exchanger 114' to the airflow 154 in a manner that can elevate the temperature of the second thermal fluid flowing through the second air-side heat exchanger 116'. Thus, as the temperature of the airflow 154 is increased by the heat transfer at the first air-side heat exchanger 114', the second air-side heat exchanger 116' is operated in a manner that seeks to recapture at least some of that heat from the airflow 154 and transfer the recaptured heat to the second thermal fluid so as to output a heated second thermal fluid from the second air-side heat exchanger 116'.

In connection with determining that the thermal management system 100''' is to operate in the second, heat pump mode, the controller 146 can also generate one or more signals to facilitate a reversal in the direction of flow of the second thermal fluid in the second fluid loop 105 such that the second thermal fluid flows in a second flow direction (as generally indicated by "$f_2$" in FIG. 10). As seen by at least a comparison of the first flow direction ($f_1$) shown in FIG. 9, and the second flow direction ($f_2$) shown in FIG. 10, the second flow direction ($f_2$) is in a direction that is opposite to the first flow direction ($f_1$). As previously discussed, such a reversal in flow direction of the second thermal fluid can be facilitated the controller 146 generating one or more signals to at least adjust the operation of one or more valves 141*a*, 141*b* of the second fluid loop 105.

Upon the second thermal fluid absorbing heat at the second air-side heat exchanger 116', the heated second thermal fluid can flow from the second air-side heat exchanger 116' to the compressor 136, which can further increase the temperature, as well as the pressure, of the heated second thermal fluid. According to embodiments in which the vehicle includes a cabin 129, at least a portion of the heated high-pressure, high-temperature second thermal fluid can flow downstream from the compressor 136 to the first internal heat exchanger 117, which, in the second, heat pump mode, can operate as a condenser. Therefore, at the first internal heat exchanger 117, thermal energy can be transferred from the second thermal fluid to the third thermal fluid so as to raise the temperature of the third thermal fluid within the third fluid loop 107, resulting in a decrease in the temperature of the second thermal fluid that is outputted from the first internal heat exchanger 117. The heat entrained in the third thermal fluid can then be used by the HVAC system 129 to heat the air temperature within cabin 129, thereby reducing the temperature of the third thermal fluid. The cooled third thermal fluid can then be recirculated to the first internal heat exchanger 117 for reheating by the generally continuous flow of the second thermal fluid.

As shown in FIG. 10, in addition to, or, alternatively, in lieu of, being provided to the first internal heat exchanger 117, at least a portion of the heated high-pressure, high-temperature second thermal fluid can flow downstream from the compressor 136 to the second internal heat exchanger 119. At the second internal heat exchanger 119, thermal energy from the heated second thermal fluid can be transferred to the fourth thermal fluid. The heated fourth thermal fluid can then be used by the fourth thermal loop for elevating, or warming, a temperature of the battery(ies) 120 before being circulated back to the second internal heat exchanger 119 for reheating.

The cooled second thermal fluid outputted from the first and/or second internal heat exchangers 117, 119 can subsequently flow through the compressor 136 before being returned to the second air-side heat exchanger 116'. At the second air-side heat exchanger 116', the recirculated second thermal fluid can again be reheated using at least a portion of the heat recaptured by the second air-side heat exchanger 116' before again flowing downstream as a heated second thermal fluid to either, or both, the first and second internal heat exchangers 117, 119. The processes of heating the second thermal fluid and subsequently transferring heat from the heated second thermal fluid can occur generally continuously while the thermal management system 100''' is operating in the second, heat pump mode.

While in the second, heat pump mode, the controller 146 can monitor information from various temperature sensors 152*a*, 152*b*, 152*e*, 152*f* to determine whether one or more, if not predetermined temperature thresholds have been satisfied to warrant changing the thermal management system 100''' from operating in the second, heat pump mode to operating in the first, AC power mode. For example, the controller 146 can determine that the thermal management system 100''' is to operate in the first, AC power mode if one or more, if not all, of the predetermined temperature thresholds for the temperature of the battery 120, one or more of the thermal fluids, and/or the air temperature within the cabin 129, among other predetermined temperature thresholds are satisfied. In response to determining that the thermal management system 100''' is to operate in the first AC mode, the controller 146 can generate one or more signals to adjust an operation of the impeller 118 such that the impeller is facilitating the flow of the airflow 154 in the first direction ($d_1$), and adjust at least an operation of the valves 141*a*, 141*b* to facilitate the second thermal fluid flowing in the first flow direction ($f_1$) about the second fluid loop 105.

In at least certain situations, while the thermal management system 100''' is operating in the second, heat pump mode, the controller 146 may determine, including, for example, via use of information provided by one or more sensors 152*a*, 152*b*, 152*e*, 152*f*, that some, but not all, of the predetermined temperature thresholds have been satisfied. In such situations, rather than switching to the first, AC mode, the controller 146 may maintain the thermal management system 100''' in the second, heat pump mode, and adjust the operation of one or more components positioned along the third and/or fourth fluid loops 107, 109. For example, as previously discussed, FIGS. 9 and 10 illustrate simplified representations of a thermal management system 100+". Accordingly, the illustrated fluid loops 103, 105, 107, 109 can include additional components and feature that are not shown in FIGS. 9 and 10. For example either or both the third and fourth fluid loops 107, 109 can include a fan, compressor, expansion valve, and/or pump. In certain situations, a temperature, such as, for example, a temperature of the corresponding load (e.g., HVAC system 127 or battery(ies) 120) or associated thermal fluid (e.g., third thermal fluid or fourth thermal fluid) in one, but not both, of the third and fourth fluid loops 107, 109 may satisfy a corresponding predetermined temperature threshold. In such a situation, rather than changing the thermal management system 100''' from operating in the second, heat pump mode to the first, AC mode, the controller 146 can generate commands to adjust the operation of one of more of the components within the fluid loop associated with the satisfaction of the corresponding predetermined threshold such that the continued operation of the thermal management system 100''' in the second, heat pump mode does not adversely impact the operation of the load 120, 128 of that subsystem 110*a*, 110*b*.

For example, the controller 146 may determine that, while the thermal management system 100''' is operating in the second, heat pump mode, information provided by a temperature sensor 152*b* indicates the battery 120 has been heated to a temperature that satisfies a corresponding predetermined temperature threshold, but information from another temperature sensor 152*f* indicates the air temperature within the cabin 129 has not attained a level selected by the operator. In such an example, rather than changing the thermal management system 100''' to operate in the first, AC mode, the controller 146 may instead continue to have the thermal management system 100''' operate in the second, heat pump mode while adjusting and operation of one or more of the fan, compressor, expansion valve, and/or pump 124, among other components, positioned along the fourth thermal loop 109 to compensate for the second internal heat exchanger 119 continuing to be used to transfer heat from the second thermal fluid to the fourth thermal fluid. In such a situation, the controller 146 may therefore continue having the thermal management system 100''' operate in the second, heat pump until the temperature of the battery 120 satisfies the corresponding predetermined temperature threshold and the temperature within the operator cabin 129 satisfies, including reaches, the temperature setting selected by the operator.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A thermal management system for an electric vehicle, comprising:

a first fluid loop fluidly coupled to a first heat load and a first air-side heat exchanger, the first fluid loop configured for a circulation of a first thermal fluid about the first fluid loop;

a second fluid loop fluidly coupled to a first internal heat exchanger and a second air-side heat exchanger, the second fluid loop configured for a circulation of a second thermal fluid about the second fluid loop;

a third fluid loop fluidly coupled to the first internal heat exchanger and a second heat load, the third fluid loop configured for a circulation of a third thermal fluid about the third fluid loop;

the thermal management system configured to selectively operate in a first mode and a second mode, wherein in the first mode:

an impeller facilitates a flow of an ambient air in a first direction wherein the ambient air flows over the second air-side heat exchanger before the ambient air flows over the first air-side heat exchanger, the first air-side heat exchanger transfers a first heat generated by an operation of the first heat load from the first thermal fluid to the ambient air, the first internal heat exchanger transfers a second heat generated by an operation of the second heat load from the third thermal fluid to the second thermal fluid, and the second air-side heat exchanger transfers the second heat from the second thermal fluid to the ambient air;

wherein in the second mode:

the impeller facilitates the flow of the ambient air in a second direction wherein the ambient air flows over the first air-side heat exchanger before the ambient air flows over the second air-side heat exchanger, the first air-side heat exchanger transfers the first heat from the first thermal fluid to the ambient air, the second air-side heat exchanger captures a recaptured heat comprising a portion of the first heat transferred to the ambient air and transfers the recaptured heat to the second thermal fluid to increase a temperature of the second thermal fluid, and the first internal heat exchanger transfers at least a portion of the recaptured heat from the second thermal fluid to the third thermal fluid to elevate a temperature of the second heat load.

2. The thermal management system of claim 1, wherein the thermal management system is configured to facilitate a flow of the second thermal fluid in a first flow direction about the second fluid loop when operated in the first mode, and configured to facilitate the flow of the second thermal fluid in a second flow direction about the second fluid loop when operated in the second mode, the second flow direction being opposite of the first flow direction.

3. The thermal management system of claim 1, wherein the second heat load comprises one or more batteries.

4. The thermal management system of claim 1, wherein the second heat load comprises an HVAC system configured to control an air temperature of a cabin of the electric vehicle.

5. The thermal management system of claim 1, further comprising a second internal heat exchanger fluidly coupled to the second fluid loop and a fourth fluid loop, the fourth fluid loop comprising a third heat load, wherein in the first mode a third heat generated by an operation of the third heat load is transferred from a fourth thermal fluid of the fourth fluid loop to the second thermal fluid at the second internal heat exchanger, the third heat being released from the second thermal fluid at the second air-side heat exchanger, and wherein in the second mode, at least another portion of the recaptured heat is transferred from the second thermal fluid to the fourth thermal fluid at the second internal heat exchanger to increase a temperature of the third heat load.

6. The thermal management system of claim 5, wherein the second heat load comprises an HVAC system configured to control an air temperature of a cabin of the electric vehicle, and wherein the third heat load comprises one or more batteries.

7. The thermal management system of claim 5, wherein the first internal heat exchanger is fluidly arranged in parallel with the second internal heat exchanger about the second fluid loop.

8. A thermal management system for an electric vehicle, the thermal management system comprising:

a first fluid loop configured to transfer, to an ambient air and when the thermal management system is operated in either a first mode or a second mode, a first heat from a first thermal fluid at a first air-side heat exchanger, the first heat generated by a first heat load;

a second fluid loop configured to transfer, when the thermal management system is operated in the first mode, a second heat from a second thermal fluid at a second air-side heat exchanger to the ambient air, the second air-side heat exchanger further configured to, when the thermal management system is operated in the second mode, capture a portion of the first heat transferred to the ambient air and transfer the portion of the first heat to the second thermal fluid;

a third fluid loop configured to, when the thermal management system is operated in the first mode, transfer, at a first internal heat exchanger, the second heat from a third thermal fluid to the second thermal fluid, the second heat being generated by an operation of a second heat load, the second fluid loop further configured to, when the thermal management system is operated in the second mode, transfer at the first internal heat exchanger, at least some of the portion of the first heat from the second thermal fluid to the third thermal fluid to elevate a temperature of the second heat load; and an impeller configured to direct a flow of the ambient air in a first direction when the thermal management system is operated in the first mode, and direct the flow of ambient air in a second direction when the thermal management system is operated in the second mode, the first direction facilitating the flow of the ambient air over the second air-side heat exchanger before the ambient air flows over the first air-side heat exchanger, the second direction facilitating the flow of the ambient air over the first air-side heat exchanger before the ambient air flows over the second air-side heat exchanger.

9. The thermal management system of claim 8, wherein the thermal management system is configured to facilitate a flow of the second thermal fluid in a first flow direction about the second fluid loop when operated in the first mode, and configured to facilitate the flow of the second thermal fluid in a second flow direction about the second fluid loop when operated in the second mode, the second flow direction being opposite of the first flow direction.

10. The thermal management system of claim 8, wherein the second heat load comprises one or more batteries.

11. The thermal management system of claim 8, wherein the second heat load comprises an HVAC system configured to control an air temperature of a cabin of the electric vehicle.

12. The thermal management system of claim 8, further comprising a fourth fluid loop, wherein in the first mode a third heat generated by an operation of a third heat load is transferred from a fourth thermal fluid of the fourth fluid loop to the second thermal fluid at a second internal heat exchanger, the third heat being released from the second thermal fluid at the second air-side heat exchanger, and wherein in the second mode, at least another portion of the first heat is transferred from the second thermal fluid to the fourth thermal fluid at the second internal heat exchanger to increase a temperature of the third heat load.

13. The thermal management system of claim 12, wherein the second heat load comprises an HVAC system configured to control an air temperature of a cabin of the electric vehicle, and wherein the third heat load comprises one or more batteries.

14. The thermal management system of claim 12, wherein the first internal heat exchanger is fluidly arranged in parallel with the second internal heat exchanger about the second fluid loop.

15. A method for operating a thermal management system, the method comprising:

directing, when the thermal management system is operating in a first mode, and by an operation of an impeller, a flow of an ambient air in a first direction at which the ambient air flows over a second air-side heat exchanger before the ambient air flows over a first air-side heat exchanger;

transferring a first heat from a first thermal fluid at the first air-side heat exchanger to the ambient air, the first heat being generated by an operation of a first heat load;

transferring, when the thermal management system is operating in the first mode, a second heat from a third thermal fluid to a second thermal fluid at a first internal heat exchanger, the second heat being generated by a second heat load;

transferring, at the second air-side heat exchanger when the thermal management system is operating in the first mode, the second heat from the second thermal fluid to the ambient air;

directing, when the thermal management system is operating in a second mode, and by the operation of the impeller, the flow of the ambient air in a second direction at which the ambient air flows over the first air-side heat exchanger before the ambient air flows over the second air-side heat exchanger;

recapturing, by the second air-side heat exchanger when the thermal management system is operating in the second mode, a portion of the first heat from the ambient air and transferring, at the second air-side heat exchanger, the portion of the first heat to the second thermal fluid; and transferring, at the first internal heat exchanger when the thermal management system is operating in the second mode, at least some of the portion of the first heat from the second thermal fluid to the third thermal fluid.

16. The method of claim 15, further comprising determining to operate the thermal management system in the second mode based at least in part on a temperature of at least one of the second heat load and the third thermal fluid, the second heat load comprising one or more batteries.

17. The method of claim 15, further comprising:

transferring, when the thermal management system is operating in the first mode, a third heat from a fourth thermal fluid to the second thermal fluid at a second internal heat exchanger, the third heat being generated by a third heat load; and transferring, at the second internal heat exchanger when the thermal management system is operating in the second mode, at least some of the portion of the first heat from the second thermal fluid to the fourth thermal fluid.

18. The method of claim 17, wherein the second heat load comprises an HVAC system configured to at least alter an air temperature of a cabin of a vehicle, and the third heat load comprises one or more batteries, and further comprising determining to operate the thermal management system in the second mode based at least in part on a temperature of at least one of the air temperature of the cabin and the one or more batteries.

19. The method of claim 18, further comprising determining to change the thermal management system from operating in the second mode to operating in the first mode in response to determining one or more predetermined temperature thresholds are satisfied.

20. The method of claim 17, wherein the third heat load is an HVAC system configured to at least alter an air temperature of a cabin of a vehicle, and wherein the method further comprises determining to change the thermal management system from operating in the second mode to operating in the first mode based at least in part on the air temperature within the cabin satisfying an operator selected temperature.

* * * * *